United States Patent
Kawaguchi

(10) Patent No.: US 11,137,724 B2
(45) Date of Patent: Oct. 5, 2021

(54) ELECTRONIC TIMEPIECE AND MOTOR CONTROL CIRCUIT

(71) Applicant: Seiko Epson Corporation, Tokyo (JP)

(72) Inventor: Takashi Kawaguchi, Shiojiri (JP)

(73) Assignee: Seiko Epson Corporation

( * ) Notice: Subject to any disclaimer, the term of this patent is extended or adjusted under 35 U.S.C. 154(b) by 11 days.

(21) Appl. No.: 16/827,898

(22) Filed: Mar. 24, 2020

(65) Prior Publication Data
US 2020/0310354 A1  Oct. 1, 2020

(30) Foreign Application Priority Data

Mar. 25, 2019  (JP) .............................. JP2019-056898

(51) Int. Cl.
*G04C 3/14* (2006.01)
*H02P 8/32* (2006.01)
*H02P 8/02* (2006.01)
*G04C 9/08* (2006.01)

(52) U.S. Cl.
CPC .............. *G04C 3/146* (2013.01); *G04C 9/08* (2013.01); *H02P 8/02* (2013.01); *H02P 8/32* (2013.01)

(58) Field of Classification Search
CPC .. G04C 3/146; G04C 9/08; G04C 9/01; H02P 8/32; H02P 8/02
See application file for complete search history.

(56) References Cited

U.S. PATENT DOCUMENTS

| 4,346,463 A | * | 8/1982 | Tu Xuan | G04C 3/143 318/696 |
| 4,542,329 A | * | 9/1985 | Tu Xuan | G04C 3/143 310/49.24 |
| 5,166,590 A | * | 11/1992 | Tu | G04C 3/143 318/685 |
| 7,701,807 B2 | * | 4/2010 | Kitazawa | G04C 3/14 368/80 |
| 2010/0001673 A1 | | 1/2010 | Cardoletti et al. | |

FOREIGN PATENT DOCUMENTS

| JP | H02-033108 B2 | 7/1990 |
| JP | 2009-542186 A | 11/2009 |

* cited by examiner

*Primary Examiner* — Antony M Paul
(74) *Attorney, Agent, or Firm* — Harness, Dickey & Pierce, P.L.C.

(57) ABSTRACT

An electronic timepiece can prevent overrunning when driving a motor at a high speed. The electronic timepiece has a controller that controls a driver to an on state or an off state according to the current value detected by the current detector; a polarity changer that determines driving one step of the motor ended and changes the polarity of the drive current when the on time or off time is detected to meet a specific condition; and a drive period adjuster that sets the terminal supplying the drive current to the coil to a first state if the remaining drive step count is greater than the remaining count evaluation number, and if the remaining drive step count is less than or equal to the remaining count evaluation number, sets the terminal to a second state in which the brake force applied to the rotor is greater than in the first state.

9 Claims, 18 Drawing Sheets

FIG. 18

| PL | 0 | | | 1 | | |
|---|---|---|---|---|---|---|
| BRAKE FORCE | LOW | MEDIUM | HIGH | LOW | MEDIUM | HIGH |
| P1 | H | H | H | H | H | H |
| P2 | H | H | H | H | H | H |
| N1 | L | L | H | H | H | H |
| N2 | H | H | H | L | L | H |
| N3 | L | L | H | H | H | H |
| N4 | H | H | H | L | L | H |
| N5 | L | L | H | H | H | H |
| N6 | H | H | H | H | H | H |

ELECTRONIC TIMEPIECE AND MOTOR CONTROL CIRCUIT

BACKGROUND

1. Technical Field

The present invention relates to an electronic timepiece and to a motor control circuit.

The present application claims priority based on and incorporates by reference the entire contents of Japanese Patent Application No. 2019-056898 filed on Mar. 25, 2019.

2. Related Art

JP-T-2009-542186 describes a technique for controlling rotation of a motor by turning the supply of current to the coil of the motor off when the current flow through the coil exceeds an upper threshold, and on when the current flow goes below a lower threshold, and estimating the position of the rotor of the motor from the on time that power supply continues and the off time during which the power supply is continuously off.

When driving the motor at a high speed with the control technology described in JP-T-2009-542186, the motor may turn an excess number of steps instead of stopping at the desired position.

SUMMARY

An electronic timepiece according to an aspect of the present disclosure has: a motor having a coil and a rotor; a driver that has a terminal through which drive current is supplied to the coil, and which is controlled to an on state supplying the drive current to the coil, and an off state not supplying the drive current; a current detector configured to detect a current value flowing through the coil; a controller configured to control the driver to the on state or the off state according to the current value detected by the current detector; a polarity changer configured to determine driving one step of the motor ended and change the polarity of the drive current when an on time, which is a continuous time of the on state of the driver, or an off time, which is a continuous time of the off state of the driver, is detected to meet a specific condition; a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to set the terminal supplying the drive current to the coil to a first state if the remaining drive step count is greater than the remaining count evaluation number, and if the remaining drive step count is less than or equal to the remaining count evaluation number, set the terminal to a second state in which a brake force applied to the rotor is greater than in the first state.

An electronic timepiece according to another aspect of the present disclosure has: a motor having a coil and a rotor; a driver that has a terminal through which drive current is supplied to the coil, and which is controlled to an on state supplying the drive current to the coil, and an off state not supplying the drive current; a current detector configured to detect a current value flowing through the coil; a controller configured to control the driver to the on state or the off state according to the current value detected by the current detector; a polarity changer configured to determine driving one step of the motor ended and change the polarity of the drive current when an on time, which is a continuous time of the on state of the driver, or an off time, which is a continuous time of the off state of the driver, is detected to meet a specific condition; a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to adjust the polarity changer to change the polarity of the drive current after a first specific time passes from detecting that the specific condition was met if the remaining drive step count is greater than the remaining count evaluation number, and if the remaining drive step count is less than or equal to the remaining count evaluation number, change the polarity of the drive current after a second specific time that is longer than the first specific time passes from detecting that the specific condition was met.

The electronic timepiece according to another aspect of the present disclosure also has a remaining count evaluation number setter configured to set the remaining count evaluation number based on a drive period of the motor.

The electronic timepiece according to another aspect of the present disclosure also has a remaining count evaluation number setter configured to set the remaining count evaluation number based on a number of drive steps or an elapsed time from the start of motor drive to convergence of the motor drive period.

In an electronic timepiece according to another aspect of the present disclosure, the first state sets the terminal to a high impedance state; and the second state sets the terminal to a shorted state.

In an electronic timepiece according to another aspect of the present disclosure, the first state sets the terminal to a high impedance state; and the second state sets the terminal to a shorted state through a specific resistance.

Another aspect of the present disclosure is a movement including: a motor having a coil and a rotor; a driver that has a terminal through which drive current is supplied to the coil, and which is controlled to an on state supplying the drive current to the coil, and an off state not supplying the drive current; a current detector configured to detect a current value flowing through the coil; a controller configured to control the driver to the on state or the off state according to the current value detected by the current detector; a polarity changer configured to determine driving one step of the motor ended and change the polarity of the drive current when an on time, which is a continuous time of the on state of the driver, or an off time, which is a continuous time of the off state of the driver, is detected to meet a specific condition; a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to set the terminal supplying the drive current to the coil to a first state if the remaining drive step count is greater than the remaining count evaluation number, and if the remaining drive step count is less than or equal to the remaining count evaluation number, set the terminal to a second state in which a brake force applied to the rotor is greater than in the first state.

Another aspect of the present disclosure is a movement including:

a motor having a coil and a rotor; a driver that has a terminal through which drive current is supplied to the coil, and which is controlled to an on state supplying the drive current to the coil, and an off state not supplying the drive current; a current detector configured to detect a current value flowing through the coil; a controller configured to control the driver to the on state or the off state according to the current value detected by the current detector; a polarity changer configured to determine driving one step of the motor ended and change the polarity of the drive current when an on time, which is a continuous time of the on state of the driver, or an off time, which is a continuous time of the off state of the driver, is detected to meet a specific condition; a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to adjust the polarity changer to change the polarity of the drive current after a first specific time passes from detecting that the specific condition was met if the remaining drive step count is greater than the remaining count evaluation number, and if the remaining drive step count is less than or equal to the remaining count evaluation number, change the polarity of the drive current after a second specific time that is longer than the first specific time passes from detecting that the specific condition was met.

Another aspect of the present disclosure is a motor control circuit including: a driver that has a terminal through which drive current is supplied to the coil of a motor, and which is controlled to an on state supplying the drive current to the coil, and an off state not supplying the drive current; a current detector configured to detect a current value flowing through the coil; a controller configured to control the driver to the on state or the off state according to the current value detected by the current detector; a polarity changer configured to determine driving one step of the motor ended and change the polarity of the drive current when an on time, which is a continuous time of the on state of the driver, or an off time, which is a continuous time of the off state of the driver, is detected to meet a specific condition; a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to set the terminal supplying the drive current to the coil to a first state if the remaining drive step count is greater than the remaining count evaluation number, and if the remaining drive step count is less than or equal to the remaining count evaluation number, set the terminal to a second state in which a brake force applied to the rotor is greater than in the first state.

A motor control circuit according to another aspect of the present disclosure includes: a driver that has a terminal through which drive current is supplied to the coil of a motor, and which is controlled to an on state supplying the drive current to the coil, and an off state not supplying the drive current; a current detector configured to detect a current value flowing through the coil; a controller configured to control the driver to the on state or the off state according to the current value detected by the current detector; a polarity changer configured to determine driving one step of the motor ended and change the polarity of the drive current when an on time, which is a continuous time of the on state of the driver, or an off time, which is a continuous time of the off state of the driver, is detected to meet a specific condition; a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to adjust the polarity changer to change the polarity of the drive current after a first specific time passes from detecting that the specific condition was met if the remaining drive step count is greater than the remaining count evaluation number, and if the remaining drive step count is less than or equal to the remaining count evaluation number, change the polarity of the drive current after a second specific time that is longer than the first specific time passes from detecting that the specific condition was met.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 18 illustrate the relationship between brake power and gate signals in the third embodiment.

DESCRIPTION OF EMBODIMENTS

Embodiment 1

An electronic timepiece 1 according to the first embodiment is described below.

Figure 1:
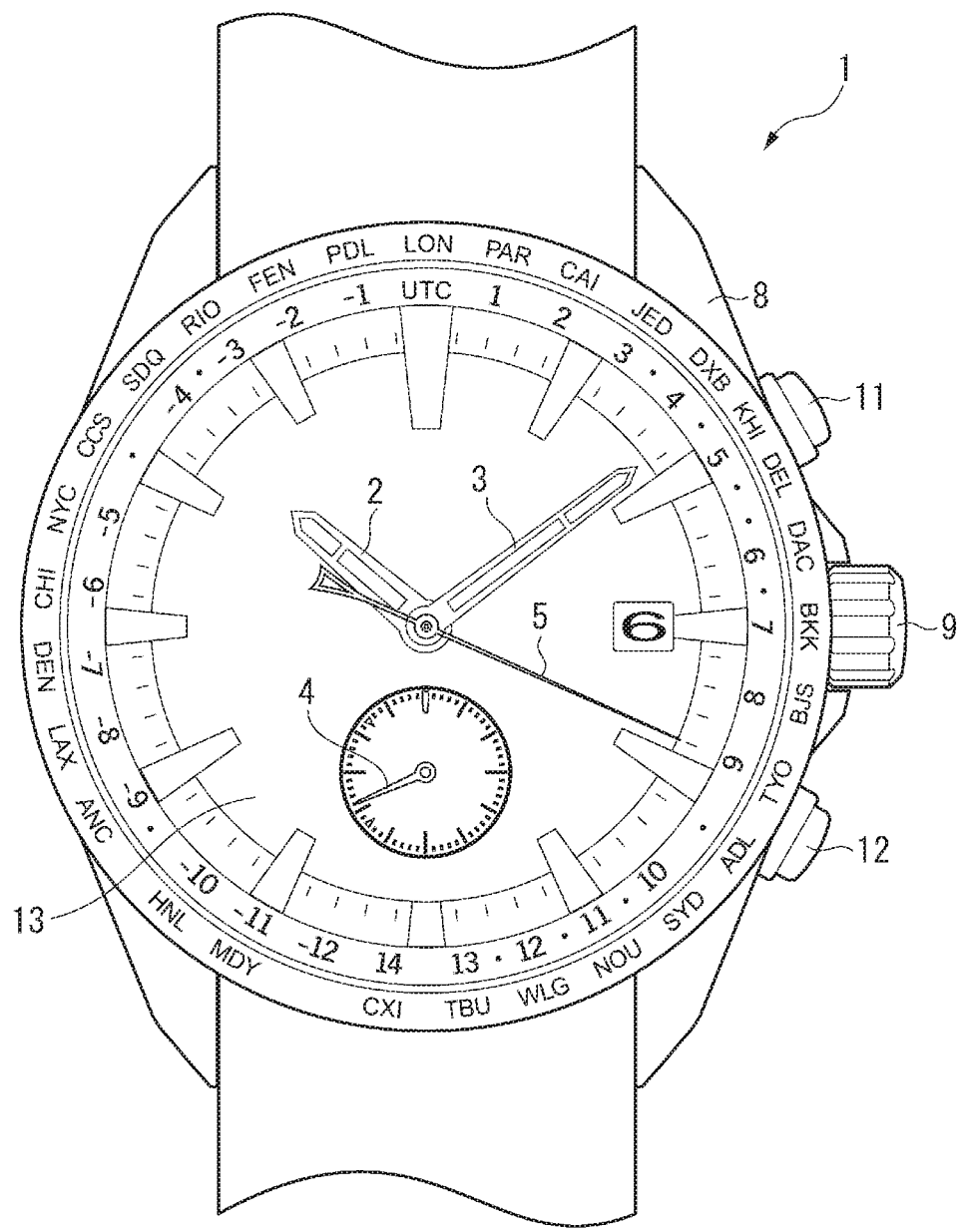
FIG. 1 is a front view of an electronic timepiece according to the first embodiment.

As shown in FIG. 1, the electronic timepiece 1 is an analog electronic timepiece having a world time function. The electronic timepiece 1 has an hour hand 2 and minute hand 3 as center hands, a small secondhand 4 at the 6:00 position, a city hand 5 disposed coaxially to the hour hand 2 and minute hand 3 and used to indicate the time zone, a crown 9, buttons 11 and 12, and a case 8 that houses the movement.

The hour hand 2, minute hand 3, and city hand 5 are disposed to three pivots located in the center of the dial 13 in a plan view perpendicular to the surface of the dial 13 of the electronic timepiece 1.

The small second hand 4 is attached to a pivot disposed separately from the other pivots towards 6:00 from the center of the dial 13 in plan view.

Circuit Configuration of the Electronic Timepiece

Figure 2:
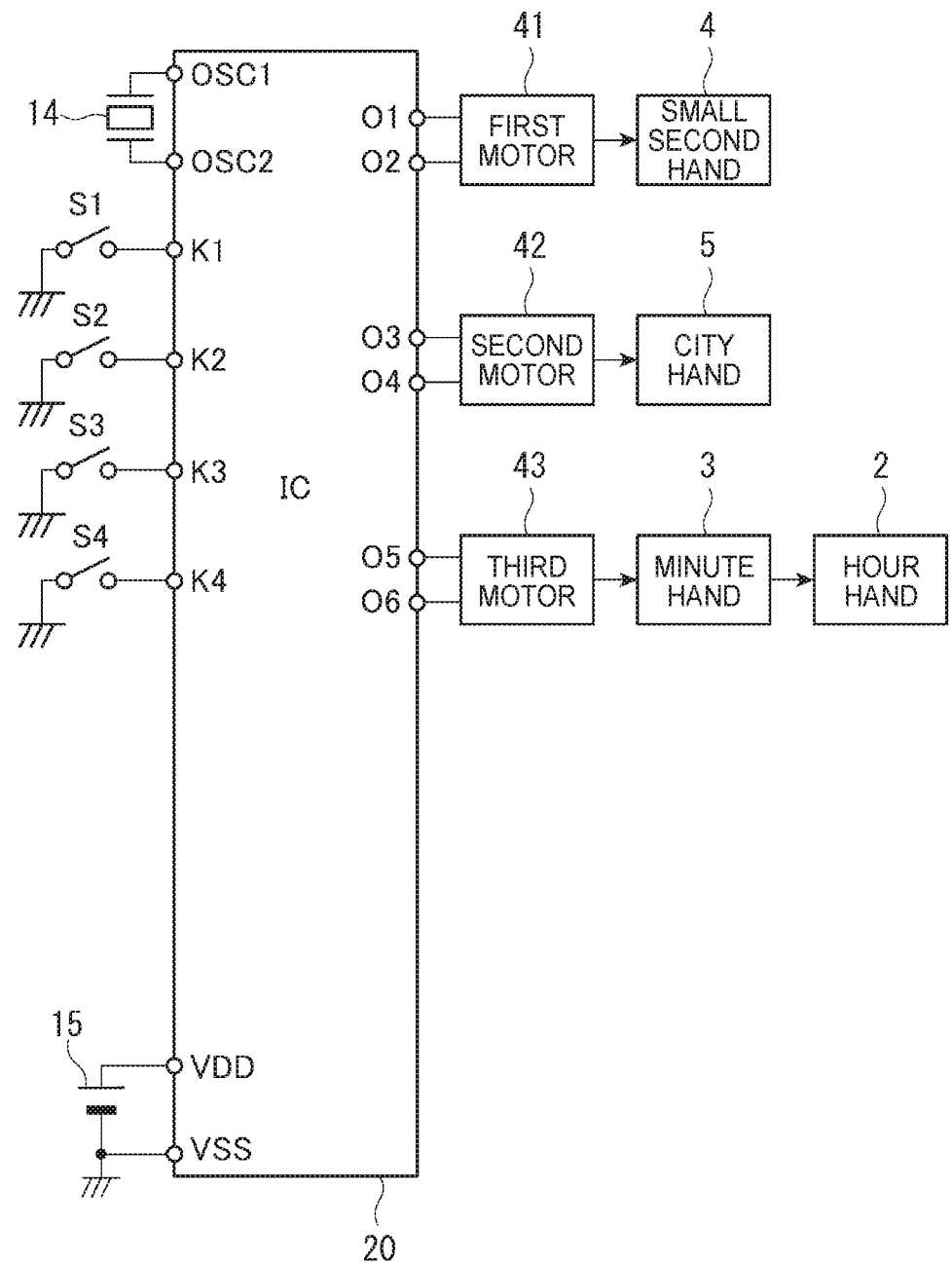
FIG. 2 is a circuit diagram illustrating the circuit configuration of the electronic timepiece according to the first embodiment.

As shown in FIG. 2, the movement of the electronic timepiece 1 includes a crystal oscillator 14, which is a signal source, a battery 15 as a power supply, push switches S1 and S2 that turn on and off in conjunction with operation of the buttons 11 and 12, slide switches S3 and S4 that turn on and off in conjunction with the crown 9 moving in and out, a first motor 41 a second motor 42, a third motor 43, and a IC chip 20.

Motor Configuration

Figure 3:
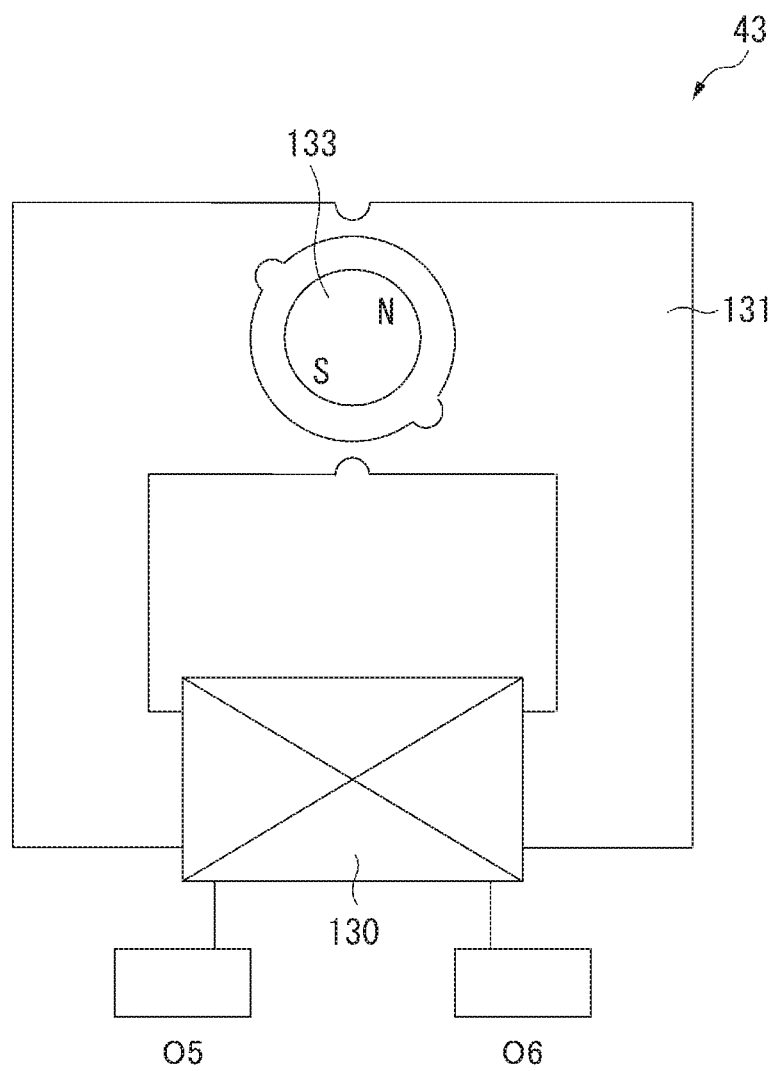
FIG. 3 illustrates the configuration of a motor of the electronic timepiece according to the first embodiment.

As shown in FIG. 3, the third motor 43 has a stator 131, a coil 130, and a rotor 133. The ends of the coil 130 have continuity with the output terminals O5 and O6 of the driver 51 described below. The rotor 133 is a magnet magnetized with two poles in the radial direction. The third motor 43 is therefore a two pole, single phase stepper motor used in electronic timepieces, and as described below is driven by a drive signal input to the driver 51.

The first motor 41 and second motor 42 are two pole, single phase stepper motors identical to the third motor 43, and further description thereof is omitted.

As shown in FIG. 2, the small second hand 4 is moved by the first motor 41, and indicates the second of the current time.

The city hand 5 is driven by the second motor 42, and indicates the name of a city in the set time zone.

The minute hand 3 and hour hand 2 are driven by the third motor 43. As a result, the minute hand 3 indicates the minute in 180 steps per rotation, and the hour hand 2 indicates the hour in 2160 steps per rotation.

As shown in FIG. 2, the IC chip 20 has connection terminals OSC1 and OSC2 to which the crystal oscillator 14 is connected, input terminals K1, K2, K3, and K4 to which the switches S1, S2, S3, S4 are connected, power supply terminals VDD and VSS to which the battery 15 is connected, and output terminals O1 to O6 to which the coils 130 of the first motor 41 to third motor 43 are connected.

Note that in this embodiment the positive pole of the battery 15 connects to the power supply terminal VDD on the high potential side, the negative pole connects to the power supply terminal VSS on the low potential side, and the power supply terminal VSS on the low potential side is set to ground (a reference potential).

The crystal oscillator 11 is driven by an oscillation circuit 21 described below and produces an oscillation signal.

The battery 15 is a primary battery or a storage battery. If a storage battery, the battery 15 may be charged by solar cell not shown, for example.

Switch S1 in this example is a push switch that operates in conjunction with operation of the button 11 disposed near the 2:00 position of the electronic timepiece 1, turns on when the button 11 is depressed, and is off when the button 11 is not depressed.

Switch S2 is a push switch that operates in conjunction with operation of the button 12 disposed near the 4:00 position of the electronic timepiece 1, turns on when the button 12 is depressed, and is off when the button 12 is not depressed.

Switches S3 and S4 are slide switches that operate in conjunction with the crown 9 moving in and out. In this embodiment, when the crown 9 is pulled out to the first stop, switch S3 is on and switch S4 is off; when at the second stop, switch S4 is on and switch S3 is off; and when at the 0 stop, switch S3 and switch S4 are both off.

Circuit Configuration of the IC Chip

Figure 4:
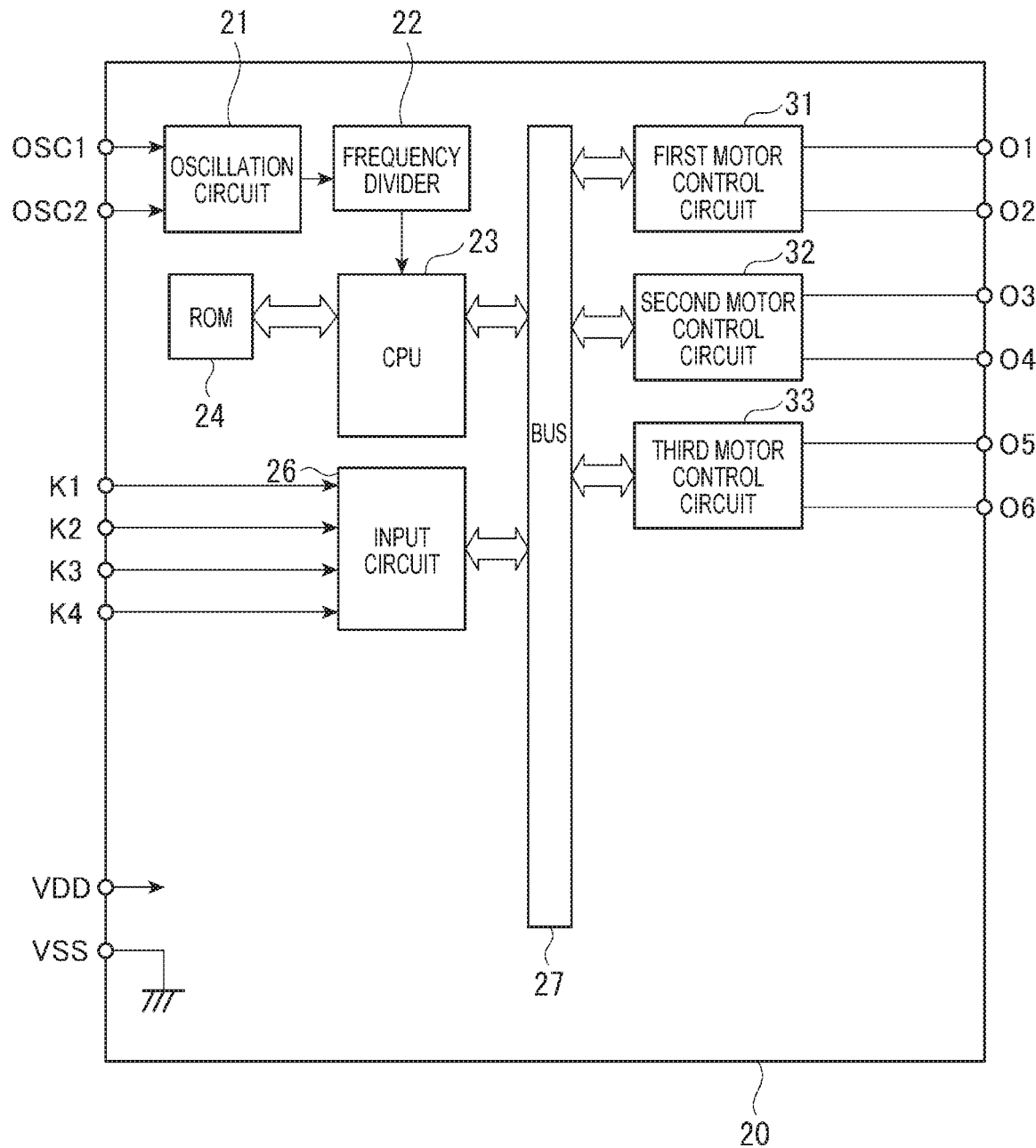
FIG. 4 is a block diagram illustrating the configuration of an IC in the electronic timepiece according to the first embodiment.

As shown in FIG. 4, the IC chip 20 includes an oscillation circuit 21, frequency divider 22, CPU 23 for controlling the electronic timepiece 1, ROM 24, an input circuit 26, and a bus 27.

CPU is an abbreviation for central processing unit, ROM is an abbreviation for read only memory, and RAM is an abbreviation for random access memory.

The IC chip 20 also includes a first motor control circuit 31 that controls the first motor 41, a second motor control circuit 32 that controls the second motor 42, and a third motor control circuit 33 that controls the third motor 43.

The oscillation circuit 21 causes the crystal oscillator 14, which is a reference signal source shown in FIG. 2, to oscillate at a high frequency, and outputs an oscillation signal at a specific frequency (32768 Hz) produced by the high frequency oscillation to the frequency divider 22.

The frequency divider 22 frequency divides the output of the oscillation circuit 21, and supplies a timing signal (clock signal) to the CPU 23.

The ROM 24 stores programs executed by the CPU 23. In this embodiment, the ROM 24 stores, for example, a program for executing a basic timekeeping function, for example.

The CPU 23 executes programs stored in ROM 24, and renders specific functions.

The input circuit 26 outputs the state of the input terminals K1, K2, K3, and K4 to the bus 27. The bus 27 is used for data transfers between the CPU 23 and the input circuit 26, first motor control circuit 31, second motor control circuit 32, and third motor control circuit 33.

The first motor control circuit 31 to third motor control circuit 33 control driving the first motor 41 to third motor 43 according to commands input from the CPU 23 through the bus 27.

Motor Control Circuit Configuration

Because the first motor 41 moves the small second hand 4 once a second, the first motor control circuit 31 is a motor control circuit used in wristwatches, for example, and enables reducing power consumption.

More specifically, after outputting a primary drive pulse with a short pulse width, the first motor control circuit 31 measures the induced EMF of the coil 130 in the first motor 41 to determine whether or not the rotor 133 is turning, and if the rotor is not turning, outputs a compensating drive pulse of a fixed pulse width that is greater than the primary drive pulse to reliably make the rotor 133 turn. Note that the first motor control circuit 31 may drive the first motor 41 by a fixed pulse.

The second motor control circuit 32 controls the second motor 42 so that the city hand 5 can be driven in both forward and reverse directions, that is, both clockwise and counterclockwise. Therefore, the second motor control circuit 32 may be configured in any way enabling controlling driving the second motor 42 in both forward and reverse directions.

Figure 5:
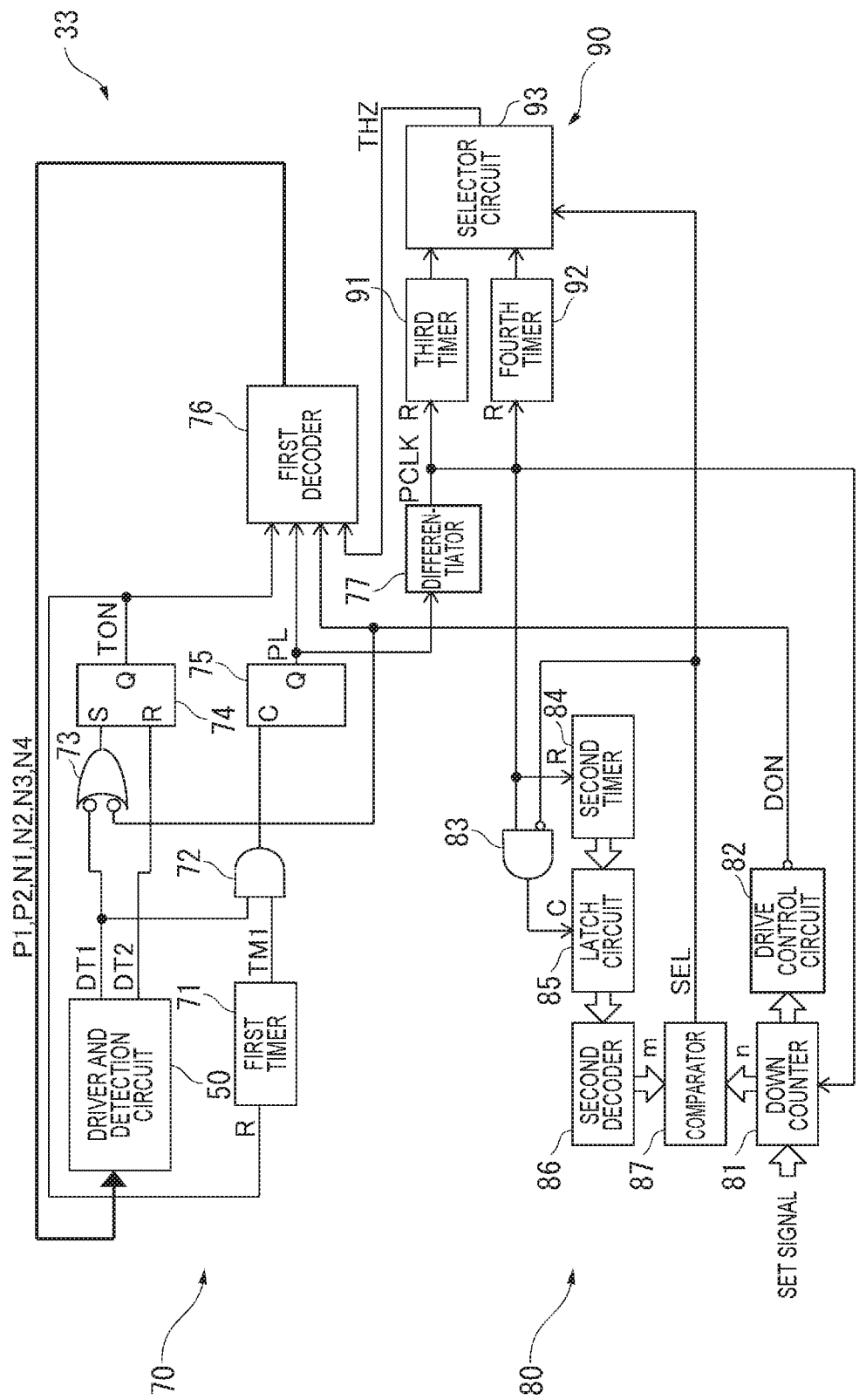
FIG. 5 is a circuit diagram illustrating the configuration of a third motor control circuit in the first embodiment.

The third motor control circuit 33 is a control circuit capable of moving the hour hand 2 and minute hand 3 rapidly when adjusting the time difference according to the city hand 5, and as shown in FIG. 5 includes a driver and detection circuit 50, polarity changer 70, remaining drive step count detector 80, and a drive period adjuster 90.

Figure 6:
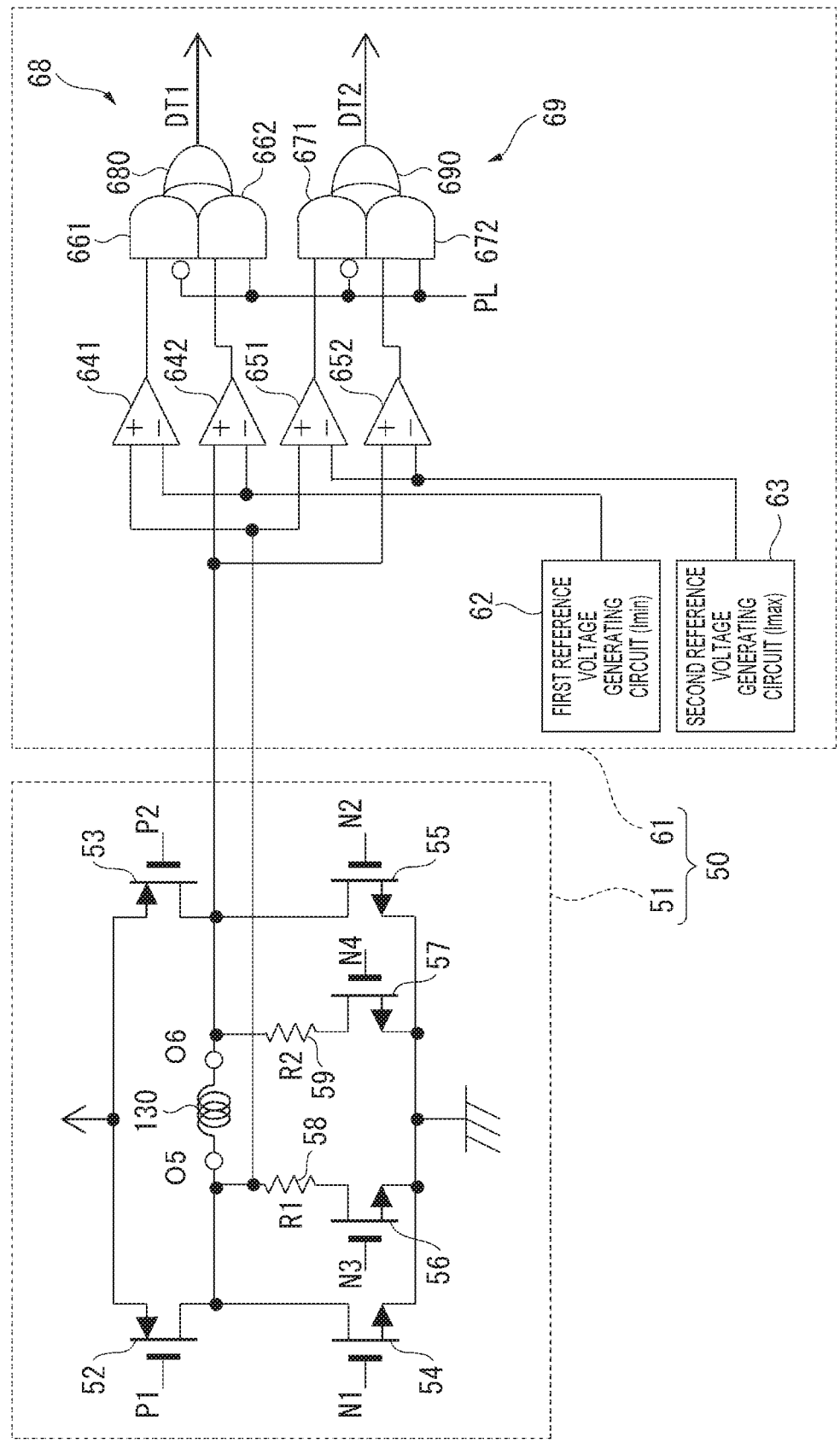
FIG. 6 is a circuit diagram illustrating the configuration of a driver and detection circuit in the first embodiment.

As shown in FIG. 6, the driver and detection circuit 50 includes a driver 51 that supplies current to the coil 130 of the third motor 43, and a current detection circuit 61 that determines whether or not the current flow through the coil 130 exceeds a specific value. The current detection circuit 61 is a current detector that detects a current value flowing through the coil 130. The driver 51 and current detection circuit 61 are described in detail below.

Polarity Changer

The polarity changer 70 is a circuit that determines when driving the third motor 43 one step has ended and controls changing the polarity of the drive current supplied to the coil 130, and includes a first timer 71, AND circuit 72, OR circuit 73, SR latch 74, flip-flop 75, decoder 76, and differentiator 77.

The first timer 71 is a timer that measures an evaluation time t1, which is a specific condition for changing the polarity of the current flow to the coil 130 of the third motor 43. If the reset terminal R of the first timer 71 goes High before the evaluation time t1 passes after the reset terminal R of the first timer 71 goes Low and the reset state is cleared, the output TM1 of the first timer 71 stays Low, but if the evaluation time t1 passes while the reset terminal R stays Low, the output TM1 goes High.

The detection signal DT1 output from the driver and detection circuit 50, and the output TM1 of the first timer 71, are input to the AND circuit 72.

The detection signal DT1 output from the driver and detection circuit 50 is inverted and input to the OR circuit 73, and the drive control signal DON output from the drive control circuit 82 is also inverted and input to the OR circuit 73.

The output of the OR circuit 73 is input to the set terminal S, and the detection signal DT2 output from the driver and detection circuit 50 is input to the reset terminal R, of the SR latch 74.

The SR latch 74 outputs from the output terminal Q a change signal TON to change the on/off state of the driver 51. The change signal TON is input to the decoder 76 and the reset terminal R of the first timer 71.

The output of the AND circuit 72 is input to the clock terminal C of the flip-flop 75.

The flip-flop 75 outputs from the output terminal Q a drive polarity signal PL that changes the polarity of the drive signal.

The change signal TON output from the SR latch 74, the drive polarity signal PL output from the flip-flop 75, the drive control signal DON output from the drive control circuit 82, and the no-drive period signal THZ output from a selector circuit 93 as described below are input to the first decoder 76.

Based on the states of these signals, the first decoder 76 outputs gate signals P1, P2, N1, N2, N3, N4 as drive signals to the driver 51 as shown in the timing chart in FIG. 9 described below.

The differentiator 77 outputs a differential signal PCLK at the rising edge and falling edge of the drive polarity signal PL.

The remaining drive step count detector 80 is a circuit that detects whether or not the remaining number of drive steps until driving the third motor 43 ends is less than or equal to a remaining count evaluation number, and includes a down counter 81, drive control circuit 82, AND circuit 83, second timer 84, latch circuit 85, a second decoder 86, and a comparator 87.

The initial number of drive steps is set in the down counter 81 based on a set signal input from the CPU 23 through the bus 27. The third motor 43 drives the hour hand 2 and minute hand 3 in conjunction with each other, and in this embodiment the minute hand 3 moves 360 steps per rotation, and the hour hand 2 moves 360×12=4320 steps per rotation.

As a result, when the button 11 is pushed to advance the city hand 5 one hour as described below, the CPU 23 outputs the set signal to the down counter 81 to set 360 steps as the number of drive steps to rapidly advance the hour hand 2 and minute hand 3 one hour.

The down counter 81 counts down, that is, subtracts 1 from the count, when the differential signal PCLK output from the differentiator 77 is input, and thereby counts the remaining number of steps until driving the third motor 43 ends. More specifically, the down counter 81 counts the remaining number of drive steps n.

The drive control circuit 82 detects the remaining number of drive steps n, which is the count of the down counter 81, and based on the remaining number of drive steps n outputs a drive control signal DON indicating whether or not the third motor 43 is being driven.

In this embodiment the drive control circuit 82 outputs the drive control signal DON High when the remaining number of drive steps n is greater than or equal to 1. When the remaining number of drive steps n is 0, the drive control circuit 82 outputs the drive control signal DON Low.

A selection signal SEL is inverted and input, and the differential signal PCLK is input directly to the AND circuit 83. When the selection signal SEL is Low and the differential signal PCLK is input, the AND circuit 83 outputs a High signal to the clock terminal C of the latch circuit 85.

The second timer 84 is reset at the falling edge of the differential signal PCLK. Because the differential signal PCLK is output each time the polarity changes, the second timer 84 counts the drive time t2 of one step. As shown in FIG. 9, the drive time t2 is the time from the timing of the falling edge of the differential signal PCLK to the timing of the next rising edge.

The latch circuit 85 latches the drive time t2 that the second timer 84 counts as time t2A at the rising edge of the differential signal PCLK.

The second decoder 86 outputs a value m, which is the remaining count evaluation number m, indicating the number of pulses before the last pulse at which to start decelerating based on the time t2A latched by the latch circuit 85. The second decoder 86 therefore functions as a remaining count evaluation number setter.

The comparator 87 compares the remaining count evaluation number m with the remaining number of drive steps n at the output timing of the differential signal PCLK, outputs a High signal as the selection signal SEL if n is less than or equal to m, and outputs a Low signal as the selection signal SEL if n is greater than m.

Drive Period Adjuster

The drive period adjuster 90 is a circuit that adjusts the drive period of the third motor 43, and includes a third timer 91, fourth timer 92, and selector circuit 93.

The third timer 91 counts a time t3, which is the length of one period from a polarity change to the output of the drive signal for the next step. As a result, the third timer 91 is reset when the differential signal PCLK is input, and outputs a High signal after time t3 has past.

The fourth timer 92 counts a time t4, which is the length of one period from a polarity change to the output of the drive signal for the next step. Note that time t4 is longer than time t3. The fourth timer 92 is reset when the differential signal PCLK is input, and outputs a High signal after time t4 has past.

The selector circuit 93 selects the output of either third timer 91 or fourth timer 92 according to the selection signal SEL output from the comparator 87, and outputs a no-drive period signal THZ to the first decoder 76.

Figure 9:
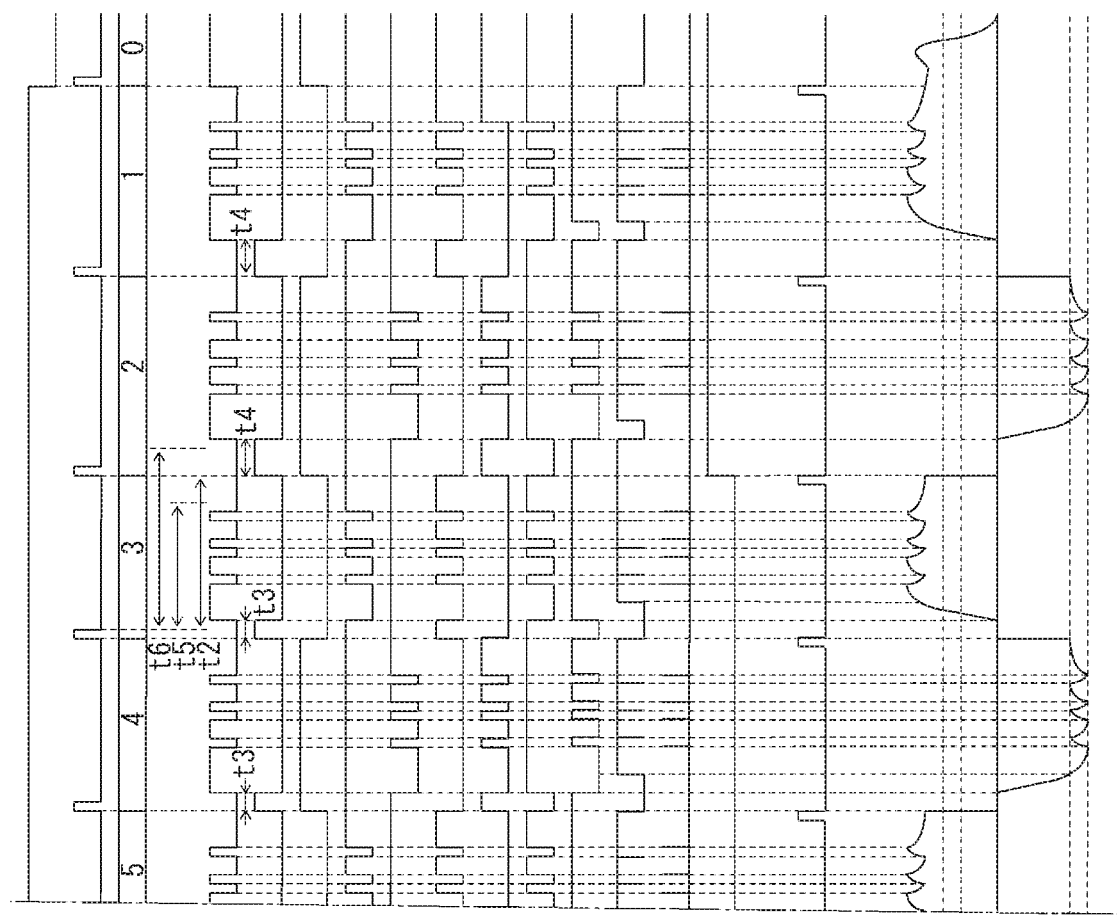
FIG. 9 is a timing chart illustrating operation of the motor control process in the first embodiment.
Figure 9:
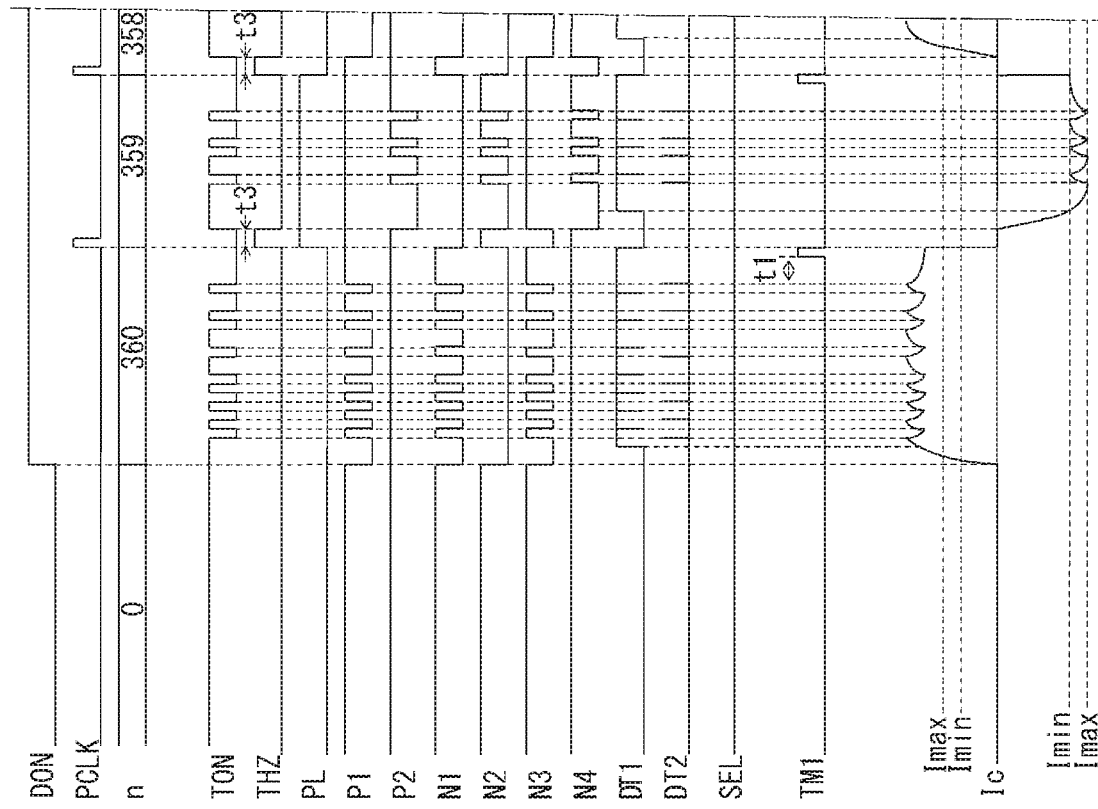

As shown in FIG. 9, when time t3 is selected, the no-drive period signal THZ changes to High at the rising edge of the differential signal PCLK, and changes to Low when time t3 has past. More specifically, when the polarity changes, the no-drive period signal THZ is High for time t3 only. Similarly, when time t4 is selected, the no-drive period signal THZ is High when the polarity changes for time t4 only.

The first decoder 76 controls the driver 51 so that drive current of the changed polarity is supplied to the coil 130 after the time set by the no-drive period signal THZ has past. Therefore, in this embodiment time t3 is a first specific time, time t4 is a second specific time, and by maintaining a high impedance state without supplying drive current for these times, the period (time) in which drive current is not supplied to the coil 130, that is, the no-drive period of the no-drive state of the rotor 133, can be changed.

Comparing the time t3 and time t4 of the no-drive period, time t4 is longer than time t3. As a result, when time t4 is selected, the timing at which the drive current is supplied is delayed compared with when the time t3 is selected, and the rotor 133 decelerates for a longer time.

Configuration of the Driver and Detection Circuit

As shown in FIG. 6, the driver and detection circuit 50 includes a driver 51 and a current detection circuit 61.

The driver 51 includes two p-channel transistors 52, 53, four n-channel transistors 54, 55, 56, 57, and two detection resistors 58, 59. The transistors 52 to 57 are controlled by the gate signals P1, P2, N1, N2, N3, N4 output from the first decoder 76, and supply both forward and reverse current to the coil 130 of the third motor 43.

The current detection circuit 61 includes a first reference voltage generating circuit 62, a second reference voltage generating circuit 63, comparators 641, 642, 651, 652, and complex gates 68, 69.

Complex gate 68 is a single element comprising the same functions as a combination of the AND circuits 661, 662, and OR circuit 680 shown in FIG. 4. Complex gate 69 is a single element comprising the same functions as a combination of the AND circuits 671, 672, and OR circuit 690.

Comparators 641, 642 compare the voltages produced at the ends of the detection resistors 58, 59 of resistances R1, R2, and the voltage of the first reference voltage generating circuit 62.

Because the drive polarity signal PL is inverted and input to AND circuit 661, and the drive polarity signal PL is input without inversion to AND circuit 662, the output of the comparator 641 or 642 selected based on the drive polarity signal PL is output as the output DT1.

The comparators 651 and 652 compare the voltages produced at the ends of the detection resistors 58, 59 of resistances R1, R2, and the voltage of the second reference voltage generating circuit 63.

Because the drive polarity signal PL is input inverted to AND circuit 671, and the drive polarity signal PL is input without inversion to the AND circuit 672, the output of the comparator 651 or 652 selected according to the drive polarity signal PL is output as output DT2.

The first reference voltage generating circuit 62 is configured to output a potential equivalent to the voltage produced at the ends of the detection resistors 58, 59 when the current flow through the coil 130 is minimum current value Imin.

Therefore, when the current I flowing through the coil 130 is greater than or equal to minimum current value Imin, the voltage produced at the ends of the detection resistors 58, 59 exceeds the output voltage of the first reference voltage generating circuit 62, and the detection signal DT1 goes High. However, when the current I is less than minimum current value Imin, the detection signal DT1 goes Low.

As a result, the first reference voltage generating circuit 62, the comparators 641 and 642, and the complex gate 68 of the current detection circuit 61 form a minimum detector that detects when the current I flowing through the coil 130 is less than minimum current value Imin.

The second reference voltage generating circuit 63 produces a voltage equivalent to maximum current value Imax. Therefore, the detection signal DT2 of the current detection circuit 61 goes High when the current I flowing through the coil 130 exceeds the maximum current value Imax, and goes Low when the current I is less than or equal to the maximum current value Imax.

As a result, the second reference voltage generating circuit 63, the comparators 651 and 652, and the complex gate 69 of the current detection circuit 61 form a maximum detector that detects when the current I flowing through the coil 130 exceeds the maximum current value Imax.

In this example, the controller that controls the on states and off states of the driver 51 according to the current value the current detection circuit 61, which is a current detector, detects, that is, the detection signals DT1 and DT2 that are the current value detection results, is configured by the OR circuit 73, SR latch 74, and first decoder 76.

When the polarity changer 70 detects that the off time Toff, which is the continuous time of the off state of the driver 51, exceeds evaluation time t1, which is a specific condition, the polarity changer 70 inverts and outputs the drive polarity signal PL to the first decoder 76 and differentiator 77, and the first decoder 76 changes the polarity of the drive current.

Control Process of the Motor Control Circuit

Figure 7:
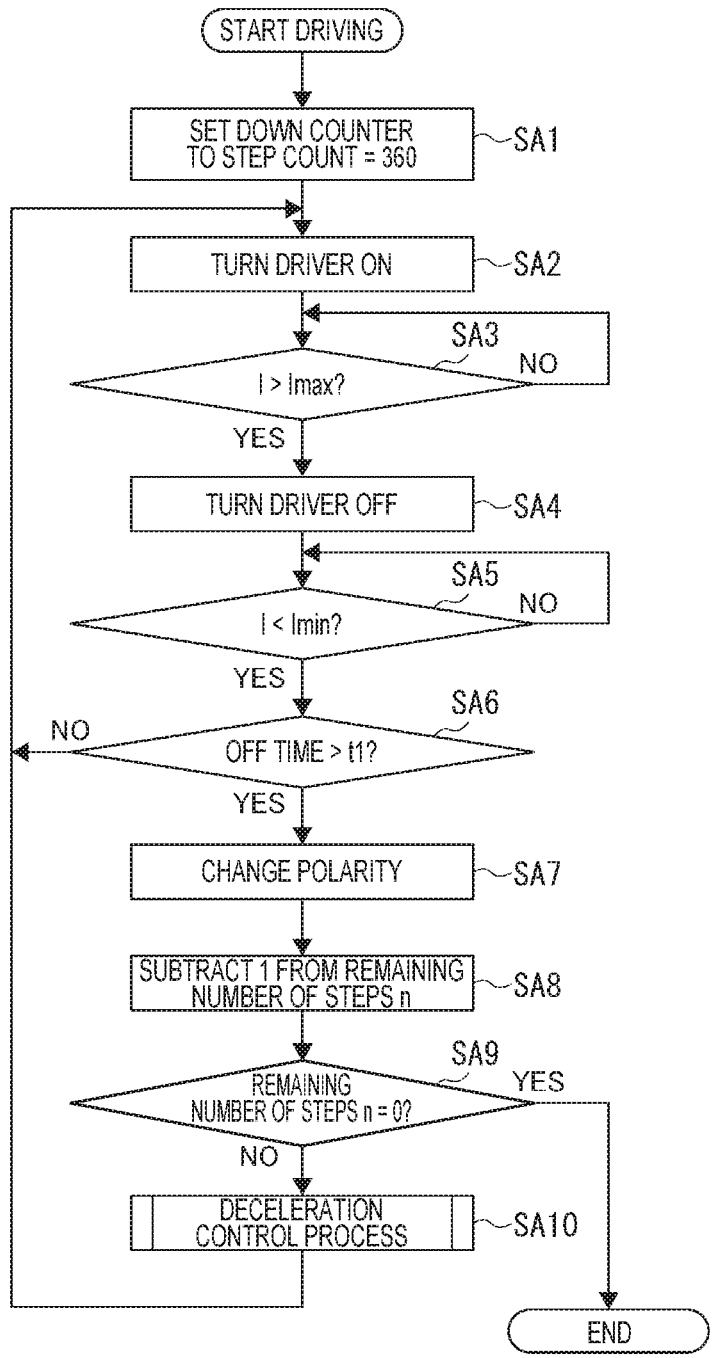
FIG. 7 is a flow chart describing the motor control process in the first embodiment.

The operation of this embodiment is described further below with reference to the flow charts in FIG. 7 and FIG. 8. Each time the button 11 is pushed and switch S1 inputs in this embodiment, the city hand 5 moves to the display position of the next city with a one hour time difference from the current position, and as the city hand 5 moves, the hour hand 2 and minute hand 3 are advanced rapidly to the positions +60 minutes ahead.

As a result, the control circuit 28 executes step S1 when there is input from switch S1 in response to operation of the button 11, and the drive pulse output from the second motor control circuit 32 causes the city hand 5 to move one step forward, that is, to the right (clockwise). The method of moving the city hand 5 can be controlled by control methods known from the literature, and further description thereof is omitted.

The operation when the city hand 5 moves +60 minutes, that is, when the hour hand 2 and minute hand 3 are advanced rapidly one hour, in other words, control by the third motor control circuit 33, is described below with reference to the flow charts in FIG. 7 and FIG. 8, and the timing chart in FIG. 9.

When the city hand 5 is moved +60 minutes in response to input from the switch S1, the CPU 23 executes step SA1 to output a set signal through the bus 27, and set the down counter 81 to 360, which is the number of steps required to move the minute hand 3 one hour.

Note that after the CPU 23 outputs the set signal and sets the number of steps in the down counter 81, the following control process is executed by circuits inside the third motor control circuit 33. More specifically, the CPU 23 simply outputs to the third motor control circuit 33 a set signal that sets the drive amount at the timing for driving the third motor 43.

When the number of steps 360 is set in the down counter 81, the drive control circuit 82 outputs the drive control signal DON High because the count of the down counter 81 is not 0, and the first decoder 76 executes step SA2 to turn the driver 51 of the third motor 43 on by means of gate signals P1, P2, N1, N2, N3, N4. When the driver 51 turns on, the third motor 43 operates and starts driving the hour hand 2 and minute hand 3.

Note that in the flow charts and following description, turning the driver 51 on means controlling the driver 51 to an on state in which drive current can flow to the coil 130, and turning the driver 51 off means controlling the driver 51 to an off state in which drive current cannot flow to the coil 130.

Note that as shown in the timing chart in FIG. 9, immediately after the drive control signal DON goes High in this embodiment, P1 is Low and P2 is High, and p-channel transistor 52 therefore turns on and p-channel transistor 53 turns off. In addition, because N1 to N3 go Low, and N4 goes High, n-channel transistors 54, 55, 56 turn off and n-channel transistor 57 turns on. As a result, current flows through p-channel transistor 52, terminal O5, coil 130, terminal O6, detection resistor 59, and n-channel transistor 57.

In this embodiment, current flowing from terminal O5 to terminal O6 through the coil 130 is current flowing in the forward direction.

In this embodiment the drive current supplied to the coil 130 changes between a first polarity and a second polarity, and when set to the first polarity, current flows in the forward direction through the coil 130. Therefore, the state in which currents flows in the forward direction through the coil 130 is the state in which the driver 51 is controlled to the on state by a drive signal of the first polarity.

Next, the third motor control circuit 33 executes the process of step SA3 to determine whether or not the current I flow through the coil 130 exceeds the maximum current value Imax. The third motor control circuit 33 returns NO in step SA3 and then repeats the evaluation process of step SA3 until the voltage produced in the detection resistors 58, 59 exceeds the reference voltage of the second reference voltage generating circuit 63.

However, if the current I exceeds the maximum current value Imax, the third motor control circuit 33 determines YES in step SA3, and sets the detection signal DT2 High.

When the detection signal DT2 goes High, the reset terminal R of the SR latch 74 goes High, and the change signal TON changes to Low. As a result, step SA4 is executed, and the decoder 76 turns the driver 51 off by means of gate signals P1, P2, N1, N2, N3, N4. More specifically, P1 goes High, P2 goes High, N1 goes High, N2 goes Low, N3 goes High, and N4 goes High.

As a result, the ends of the coil 130 are connected to the power supply terminal VSS and shorted, and the supply of current from the driver 51 to the coil 130 stops.

Therefore, the state in which current is not supplied to the coil 130 is a state in which the driver 51 is controlled to the off state. In this embodiment the state in which p-channel transistors 52, 53 and n-channel transistor 55 are off, and n-channel transistors 54, 56, 57 are on is the off state of the driver 51 when driven by the first polarity.

Next, the third motor control circuit 33 executes step SA5, and determines whether or not the current I flowing through the coil 130 dropped below the minimum current value Imin. When he third motor control circuit 33 determines YES in step SA5, the third motor control circuit 33 goes to step SA6 and determines whether or not the off time of the driver 51 exceeds evaluation time t1.

In other words, if the time past between when the driver 51 turns off and the current I goes below the minimum current value Imin, that is, the off time, is less than or equal to the evaluation time t1, the third motor control circuit 33 determines NO in step SA6, but if this elapsed time exceeds the evaluation time t1, the third motor control circuit 33 determines YES in step SA6. More specifically, if the output TM1 is High when the current I goes below the minimum current value Imin and YES is determined in step SA6, the off time of the driver 51 can be determined to have exceeded the evaluation time t1, but if the output TM1 is Low, the third motor control circuit 33 determines the evaluation time t1 has not been exceeded.

When the third motor control circuit 33 returns NO in step SA6, the third motor control circuit 33 returns to step SA2 without changing the polarity, turns the driver 51 on, and drives the third motor 43.

The relationship between the on time Ton, which is the time the driver 51 is on, the off time Toff, which is the time the driver 51 is off, the induced EMF V, drive voltage E, drive current i, and coil resistance R is shown in equation (1) below, and the optimal timing for changing the drive polarity can be estimated from the induced EMF V.

$$V=E*Ton/(Ton+Toff)-R*i \quad (1)$$

As a result, when the off time Toff does not exceed the evaluation time t1, the third motor control circuit 33 determines NO in step SA6, again turns the driver 51 on, and executes step SA2 to resume supplying drive current to the coil 130.

If the off time Toff exceeds the evaluation time t1, the third motor control circuit 33 determines that the rotor 133 rotated 180 degrees, executes step SA7 to change the polarity, and then executes step SA8 to reduce the remaining number of drive steps n counted by the down counter 81 by 1.

Next, the third motor control circuit 33 executes step SA9 to determine if the remaining number of drive steps n is 0. If step SA9 determines YES, the third motor control circuit 33 determines moving the hour hand 2 and minute hand 3 quickly one hour was completed and stops driving the third motor 43.

More specifically, if the remaining number of drive steps n counted by the down counter 81 goes to 0, the drive control circuit 82 sets the drive control signal DON Low and ends drive control of the third motor 43.

If the third motor control circuit 33 determines NO in step SA9, the third motor control circuit 33 executes the deceleration control process SA10.

When the third motor control circuit 33 starts the deceleration control process SA10, the selection signal SEL output from the comparator 87 is High and the third motor control circuit 33 executes step SA11 to determine whether or not the no-drive period signal THZ is set to time t4.

If the third motor control circuit 33 determines NO in step SA11, the third motor control circuit 33 executes step SA12 to latch by the latch circuit 85 the drive time t2 measured by the second timer 84 as time t2A.

However, if the third motor control circuit 33 determines YES in step SA11, the third motor control circuit 33 does not execute step SA12.

As shown in FIG. 9, the comparator 87 outputs the selection signal SEL Low when a step count of 360 is set in the down counter 81 and driving the third motor 43 starts. As a result, the no-drive period signal THZ output by the selector circuit 93 is set to the time t3 counted by the third timer 91, and NO is determined in step SA11. Therefore, step SA12 is executed each time the polarity changes until time t4 is set as the no-drive period signal THZ.

The second decoder 86 of the third motor control circuit 33 sets the remaining count evaluation number m of the remaining number of steps based on the value of the time t2A latched by the latch circuit 85. More specifically, the second decoder 86 executes step SA13 to determine whether or not the time t2A is less than a minimum evaluation time t5, and if YES is determined in step SA13, that is, if t2A<t5, the second decoder 86 executes step SA14 to set the remaining count evaluation number m to 3.

If the second decoder 86 determines No in step SA13, the second decoder 86 executes step SA15 to determine whether or not time t2A is less than a maximum evaluation time t6.

If the second decoder 86 determines YES in step SA15, that is, if t5≤t2A<t6, the second decoder 86 executes step SA16 to set the remaining count evaluation number m to 2.

If the second decoder 86 determines NO in step SA15, that is, if t2A≥t6, the second decoder 86 executes step SA17 to set the remaining count evaluation number m to 1.

Next, the comparator 87 executes step SA18 to determine if the remaining number of drive steps n counted by the down counter 81 is less than or equal to the remaining count evaluation number m, that is, if n≤m.

If the comparator 87 determines NO in step SA18, the comparator 87 outputs the selection signal SEL Low and executes step SA19 to set the no-drive period signal THZ to the time t3 the third timer 91 measures.

If the comparator 87 determines YES in step SA18, the comparator 87 sets the selection signal SEL High and executes step SA20 to set the no-drive period signal THZ to the time t4 the fourth timer 92 measures.

Next, after executing step SA21 at the timing of the polarity change to set the driver 51 to a high impedance state for only the time of the no-drive period signal THZ, the first decoder 76 executes step SA22 to determine whether or not a time greater than or equal to the time of the no-drive period signal THZ has past.

If the first decoder 76 determines NO in step SA22, the first decoder 76 maintains the high impedance state of the driver 51.

If the time of the no-drive period signal THZ has past and the first decoder 76 determines YES in step SA22, the first decoder 76 ends the deceleration control process SA10, returns to step SA2, and starts outputting the drive pulse of the next step.

As a result, if the remaining number of drive steps n is less than or equal to the remaining count evaluation number m, the length of the high impedance state increases to time t4, the drive force applied to the rotor 133 decreases compared with when the length of the high impedance state is time t3 due to the friction resistance of the pivot of the rotor 133, for example, the rotor 133 decelerates and the rotor 133 is prevented from overrunning.

In other words, the deceleration control process SA10 can control deceleration of the rotor 133 by changing the no-drive period during which drive current is not supplied.

For example, as shown in the timing chart in FIG. 9, because time t2A is greater than or equal to minimum evaluation time t5 and is less than maximum evaluation time t6, when m=2 is selected and n=2, that is, from one step before the last step, the no-drive period signal THZ is changed to time t4, which is longer than time t3.

Note that the specific values of t1, t3, t4, t5, and t6 may be set appropriately according to the type of hands to be driven, the speed when driven quickly, the performance of the third motor 43, and other factors. In addition, the ratio between time t3 and time t4, which determine the no-drive period in which drive current is not supplied as the high impedance state of the ends of the coil 130, can be set as desired, but time t4 is preferably set in a range of approximately two to five times time t3.

Effect of Embodiment 1

The third motor control circuit 33 in this embodiment can more quickly decelerate the rotor 133 and prevent the rotor 133 from overrunning because the no-drive period in which drive current is not supplied becomes longer and the timing for supplying drive current is delayed by changing the no-drive period signal THZ from time t3 to a longer time t4 when the remaining number of drive steps n is less than or equal to the remaining count evaluation number m.

Furthermore, because the remaining count evaluation number m is set based on the time t2A the drive time t2 is latched, that is, based on the rotational speed of the third motor 43, the rotor 133 can more reliably be prevented from overrunning.

More specifically, because the rotational speed of the third motor 43 is high and the chance of overrunning is high when the time t2A is less than minimum evaluation time t5, by setting m=3 so the no-drive period is long, that is, by changing to control enabling greater deceleration of the rotor 133 at an early time, overrunning can be reliably prevented.

However, because the rotational speed of the third motor 43 is low and the chance of overrunning is also low when the time t2A is greater than or equal to maximum evaluation time t6, changing to control increasing the deceleration period can be done just before stopping by setting m=1.

Furthermore, because the rotational speed of the third motor 43 is moderate when the time t2A is greater than or equal to minimum evaluation time t5 and is less than maximum evaluation time t6, the timing for increasing the no-drive period can be set between the timing when the rotational speed is high and the between the timing when the rotational speed is low by setting m=2, and the rotor 133 can be suitably decelerated and overrunning can be prevented.

The third motor control circuit 33 can therefore prevent the rotor 133 from overrunning and can stop the hour hand 2 and minute hand 3 at specific positions while controlling driving the third motor 43 quickly.

Because the third motor control circuit 33 is configured by a dedicated circuit using logic devices, the third motor control circuit 33 enables low voltage drive and reduces power consumption compared with a configuration using a CPU 23, and is particularly well suited to a mobile electronic timepiece 1 such as a wristwatch.

First Variation of Embodiment 1

The third timer 91 may be omitted and time t3 set to 0. More specifically, a high impedance state may be omitted until the remaining number of drive steps n is less than or equal to the remaining count evaluation number m, and drive may proceed immediately to the next step.

Embodiment 2

An electronic timepiece according to the second embodiment is described next with reference to FIG. 10 to FIG. 13. Note that configurations in the second embodiment that are the same or similar to those in the first embodiment are identified by like reference numerals, and further description thereof is omitted.

The electronic timepiece according to this second embodiment evaluates the load on the third motor 43 and adjusts the timing for changing deceleration control based on the number of steps until the drive period of the 43 stabilizes.

In the first embodiment described above the no-drive period until supplying drive current of a different polarity changes, and the degree of deceleration of the rotor 133 changes, according to time t3, which is a first specific time, and time t4, which is a second specific time. In this second embodiment, however, the deceleration control amount is changed by switching between a high impedance state, which is a first state, and a shorted state, which is a second state.

More specifically, because drive current is not supplied to the coil 130 in the high impedance state, which is a first state, force causing the rotor 133 to turn is not applied. As a result the effect of friction with the pivot of the rotor 133 increases and the rotor 133 can be decelerated. However, because a short brake is applied to the rotor 133 in the shorted state, which is a second state, the deceleration control amount of the rotor 133 can be increased compared with the first state, and the rotor 133 can be decelerated more quickly.

Configuration

An electronic timepiece according to the second embodiment is described next.

Figure 10:
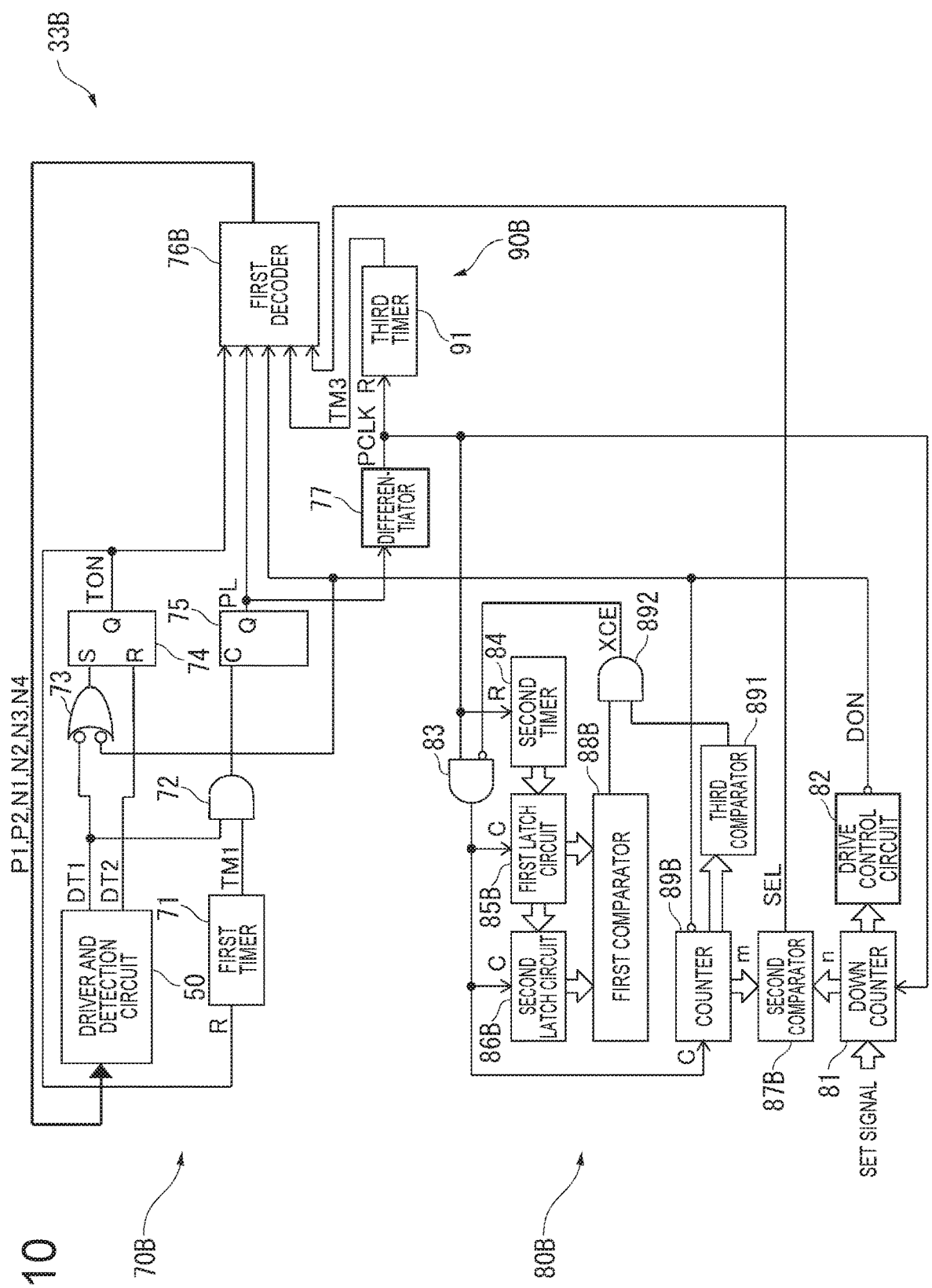
FIG. 10 is a circuit diagram illustrating the configuration of a third motor control circuit in a second embodiment.

The electronic timepiece according to the second embodiment uses a third motor control circuit 33B as shown in FIG. 10 instead of the third motor control circuit 33 of the first embodiment.

The third motor control circuit 33B in this embodiment includes a driver and detection circuit 50, polarity changer 70B, remaining drive step count detector 80B, and a drive period adjuster 90B. The driver and detection circuit 50 is configured as described in the first embodiment, and further description thereof is omitted.

The polarity changer 70B includes a first timer 71, AND circuit 72, OR circuit 73, SR latch 74, flip-flop 75, and differentiator 77 configured as described in the first embodiment, and a first decoder 76B that differs from the first decoder 76 in the first embodiment.

As described below, the first decoder 76B differs from the first decoder 76 in the first embodiment in that the selection signal SEL and the output TM3 of the third timer 91 are input to the first decoder 76B in addition to the change signal TON, drive polarity signal PL, and drive control signal DON, and the first decoder 76B outputs the gate signals P1, P2, N1, N2, N3, N4 based on these input signals.

Note that in the second embodiment the controller that controls the on states and off states of the driver 51 according to the current value the current detection circuit 61, which is a current detector, detects, that is, the detection signals DT1 and DT2 that are the current value detection results, is configured by the OR circuit 73, SR latch 74, and first decoder 76B as in the first embodiment.

The remaining drive step count detector 80B includes a down counter 81, drive control circuit 82, AND circuit 83, and a second timer 84 configured as in the first embodiment. Unlike in the first embodiment, the remaining drive step count detector 80B also has a first latch circuit 85B, a second latch circuit 86B, a first comparator 88B, a second comparator 87B, a counter 89B, a third comparator 891, and an AND circuit 892.

The output signal XCE of the AND circuit 892 is inverted and input, and the differential signal PCLK is input directly, to the AND circuit 83. When signal XCE is Low and differential signal PCLK is input, the AND circuit 83 outputs a High level signal to the first latch circuit 85B and latches the first latch circuit 85B.

The second timer 84 is reset at the falling edge of the differential signal PCLK. Because the differential signal PCLK is output each time the polarity changes, the second timer 84 counts the drive time t2 of one step.

The latch circuit 85B latches the drive time t2 of the second timer 84 as time t2A at the rising edge of the differential signal PCLK.

The second latch circuit 86B latches the time t2A that the first latch circuit 85B latched as time t2B at the rising edge of the differential signal PCLK.

In other words, at the timing when the differential signal PCLK rises and the polarity changes, the drive time t2 of the step immediately preceding, that is, one step before, is stored as time t2A, and the drive time of the step two steps before is stored as time t2B.

The first comparator 88B determines if the difference between time t2A and time t2B is less than a specific value tmin, and if the difference is less than specific value tmin, holds the signal output to the AND circuit 892 High.

The third comparator 891 is a circuit that outputs High when the remaining count evaluation number m counted by the counter 89B is greater than or equal to 1, and outputs Low when less than 1. The signal XCE output from the AND circuit 83 therefore remains Low when the difference between time t2A and time t2B is less than specific value tmin and m is greater than or equal to 1, and blocks output of the clock signal input to the first latch circuit 85B, second latch circuit 86B, and counter 89B.

In other words, when the drive period stabilizes and the difference from the previous drive time is less than specific value tmin, updating the values latched by the first latch circuit 85B and second latch circuit 86B, and updating the remaining count evaluation number m of the counter 89B, stops.

The counter 89B counts the differential signal PCLK while the signal XCE is Low, that is, until the drive period stabilizes and signal XCE goes High, and outputs remaining count evaluation number m. The counter 89B is therefore a remaining count evaluation number setter. In this second embodiment a short brake is applied to the rotor 133 from m pulses before the last pulse, and variable m is set so the deceleration control amount of the rotor 133 increases.

When the drive control signal DON is inverted and input to the counter 89B and the drive control signal DON is converted from Low to High, the counter 89B is reset and is set to an initial value of −1.

The second comparator 87B compares the remaining count evaluation number m counted by the counter 89B and the remaining number of drive steps n counted by the down counter 81, outputs a High level signal as the selection signal SEL if n is less than or equal to m, and outputs a Low level signal as the selection signal SEL if n is greater than m.

The drive period adjuster 90B has a third timer 91.

The third timer 91 counts the time t3 until the drive signal for the next step is output after the polarity changes. The third timer 91 is reset when the differential signal PCLK is input, and outputs output TM3 High after time t3 passes.

Operation of Embodiment 2

Control by the third motor control circuit 33B in the second embodiment is described below with reference to the flow charts in FIG. 11 and FIG. 12, and the timing chart in FIG. 13.

Control by the third motor control circuit 33B in this embodiment also controls moving the city hand 5 +1 hour, and therefore also controls rapidly moving the hour hand 2 and minute hand 3 +60 minutes. As a result, the operations in steps SB1 to SB9 in the flow chart in FIG. 11 are the same as the operations in steps SA1 to SA9 in the flow chart in FIG. 7 for the first embodiment, further description thereof is omitted, and processes that are different from the first embodiment are described below.

When the third motor control circuit 33B starts driving, the third motor control circuit 33B executes steps SB1-SB9 as in the first embodiment.

If the third motor control circuit 33B determines YES in step SB9, the third motor control circuit 33B determines that moving the hands 3 one hour was completed, and executes step SB10 to set the remaining count evaluation number m of the counter 89B to −1.

More specifically, when the remaining number of drive steps n of the down counter 81 changes to 0, the drive control signal DON output from the drive control circuit 82 changes to Low, and by inputting the inverted drive control signal DON to the reset terminal R of the counter 89B, the remaining count evaluation number m of the counter 89B is set to an initial value of −1. In addition, because m is initialized to −1 when driving ends, the selection signal SEL from the second comparator 87B, the output of the third comparator 891, and the signal XCE output from the AND circuit 892 go Low.

However, if the third motor control circuit 33B determines NO in step SB9, the third motor control circuit 33B executes the deceleration control process SB20.

Figure 12:
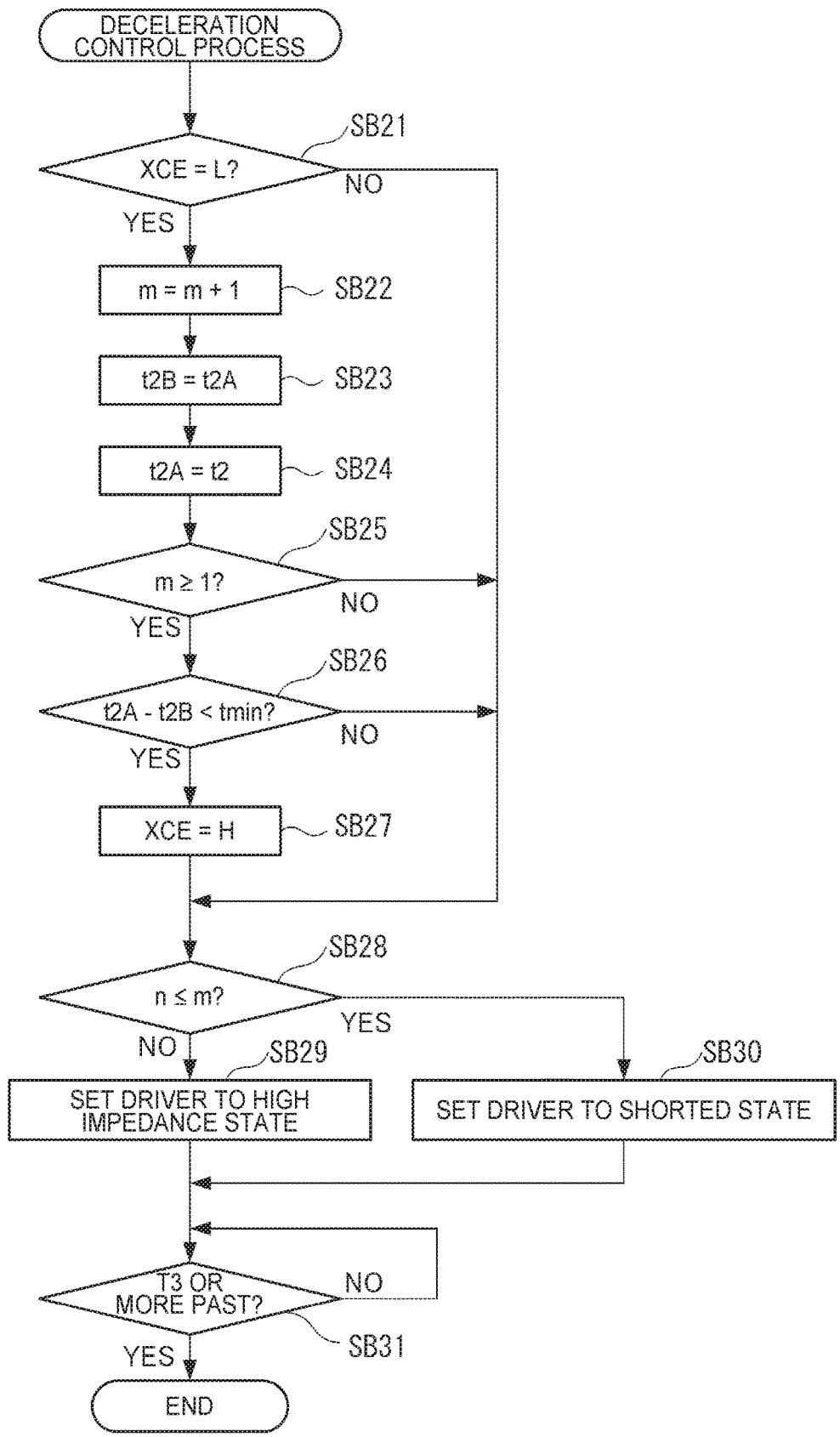
FIG. 12 is a flow chart describing a deceleration control process in the second embodiment.

As shown in FIG. 12, the deceleration control process SB20 first executes a step SB21 to determine whether or not signal XCE is Low. As described above, because the signal XCE was initialized to Low when the previous drive process ended, when driving the first step ends and the polarity changes, that is, when the remaining number of drive steps n is counted down to 359 in the timing chart in FIG. 13, the signal XCE is held Low, and step SB21 returns YES.

If the third motor control circuit 33B determines YES in step SB21, the third motor control circuit 33B executes the process of steps SB22 to SB24. More specifically, at the rising edge of the differential signal PCLK, the signal output from the AND circuit 83 is input to the clock input of the first latch circuit 85B, second latch circuit 86B, and counter 89B, and the counter 89B adds +1 to the remaining count evaluation number m.

As a result, when the deceleration control process SB20 is executed the first time after driving starts, m=−1+1=0 in step SB22. In step S24 time t2A is latched by the first latch circuit 85B, but in step S23 time t2B is not latched by the second latch circuit 86B, that is, time t2B=0.

Then in step SB25 NO is determined because m=0. As a result, steps SB26 and SB27 are not executed, and step SB28 is executed.

Because n=359 and m=0 in step SB28, NO is returned, step SB29 is executed, and for time t3, the driver 51 is held to the high impedance state. The deceleration control amount of the rotor 133 is therefore kept low.

Figure 11:
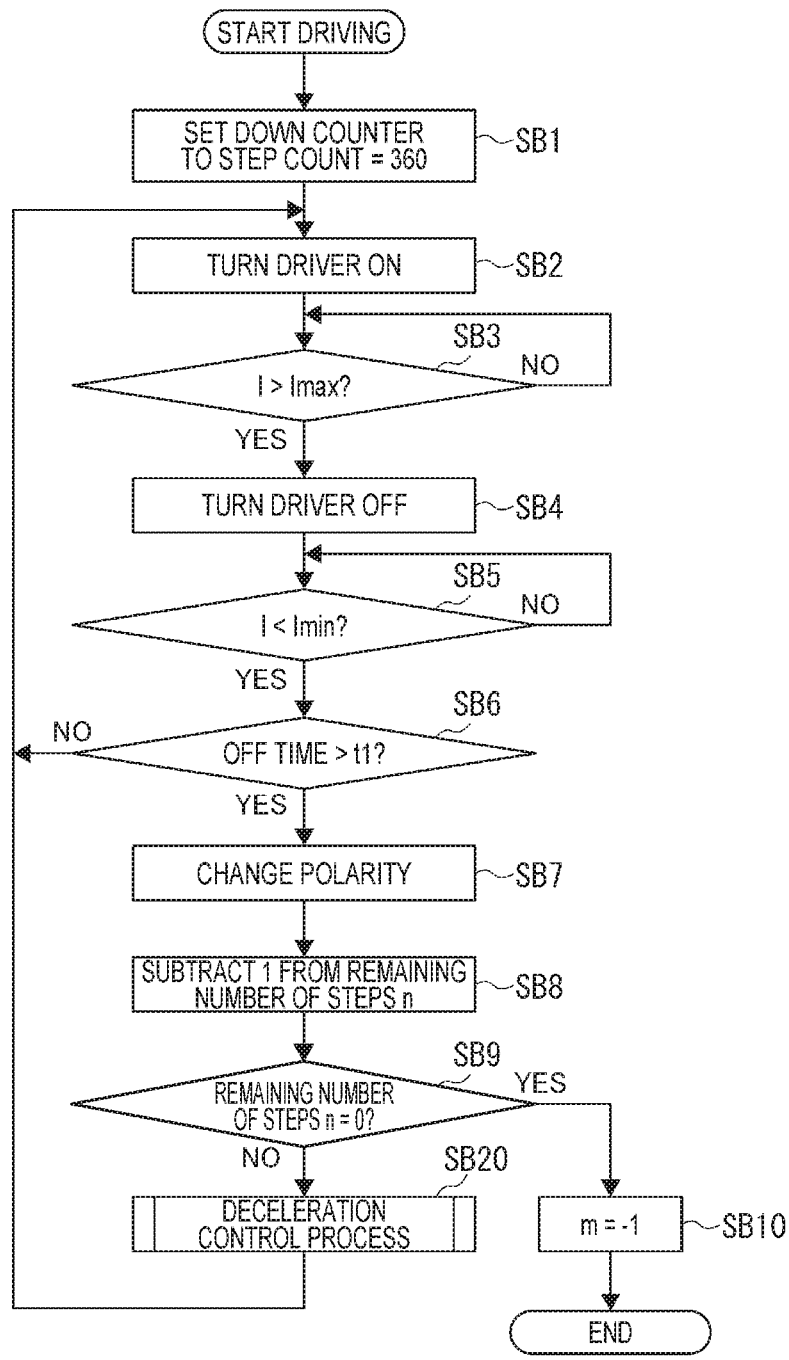
FIG. 11 is a flow chart describing the motor control process in the second embodiment.

When the third motor control circuit 33B determines YES in step SB31, the third motor control circuit 33B ends the deceleration control process SB20, returns to step SB2 in FIG. 11, executes steps SB2 to SB9, and if NO is returned in step SB9, executes the deceleration control process SB20 again.

In the second iteration of the deceleration control process SB20, the remaining count evaluation number m of the counter 89B is 0, the third comparator 891 holds Low, and the signal XCE output from the AND circuit 892 stays Low. As a result, the third motor control circuit 33B again determines YES in step SB21.

When the third motor control circuit 33B determines YES in step SB21, the third motor control circuit 33B executes the process of steps SB22 to SB24. More specifically, at the rising edge of the differential signal PCLK, the signal output from the AND circuit 83 is input to the clock input of the first latch circuit 85B, second latch circuit 86B, and counter 89B, the counter 89B adds +1 to the remaining count evaluation number m, and the remaining count evaluation number m goes to 1. The second latch circuit 86B also latches the previous count t2A of the second timer 84 latched by the first latch circuit 85B as time t2B. The first latch circuit 85B latches the current count t2 of the second timer 84 as time t2A.

Because step SB22 set m to m=1, the third motor control circuit 33B determines YES in step SB25, and executes step SB26.

In step S26 the first comparator 88B compares the difference between time t2A and time t2B with specific value tmin, and determines whether or not t2A−t2B<tmin is true.

If the first comparator 88B determines NO in step SB26, the first comparator 88B holds signal XCE Low. If the first comparator 88B determines YES, the first comparator 88B goes to step SB27 and sets signal XCE High.

If the signal XCE is set to High, NO is returned in step SB21, and steps SB22 to SB27 are not executed. As a result, the remaining count evaluation number m of the counter 89B does not change. More specifically, because the output of the AND circuit 83 is held Low when signal XCE goes High, there is no signal input to the first latch circuit 85B, second latch circuit 86B, and counter 89B. As a result, the first latch circuit 85B, second latch circuit 86B, and counter 89B hold the current values. The remaining count evaluation number m of the counter 89B is therefore set to the number of steps until the drive period stabilizes.

Next, the second comparator 87B executes step SB28, and determines whether or not the remaining number of drive steps n in the down counter 81 is less than or equal to the remaining count evaluation number m of counter 89B.

If the first decoder 76B determines NO in step SB28, the first decoder 76B executes step SB29 to set the terminals O5 and O6 of the driver 51 to the high impedance state, which is the first state. If the first decoder 76B determines YES in step SB28, the first decoder 76B executes step SB30 to set the terminals O5 and O6 of the driver 51 to the shorted state, which is a second state.

Next, the first decoder 76B executes step SB31 to determine if time t3 has past since the rising edge of the differential signal PCLK, and repeats step SB31 until step SB31 returns YES. As a result, the driver 51 is controlled to the high impedance state or the shorted state until time t3 passes after the polarity changed.

When the terminals O5 and O6 of the driver 51 are shorted, a short brake is applied, the deceleration control amount is greater than in the high impedance state, and the rotor 133 decelerates more quickly.

However, if the terminals O5 and O6 of the driver 51 are set to the high impedance state, a brake is not applied, the rotor 133 decelerates during the no-drive period when drive current is not supplied, and the deceleration control amount is less than when in the shorted state.

When the first decoder 76 determines YES in step SB31, the deceleration control process SB20 ends, control goes to step SB2 in FIG. 11, and the process repeats from step SB2 to the deceleration control process SB20 until YES is determined in step SB9.

As a result, when the remaining number of drive steps n becomes less than or equal to the remaining count evaluation number m, the deceleration control amount increases because a short brake is applied to the rotor 133, and overrunning of the rotor 133 is prevented.

Figure 13:
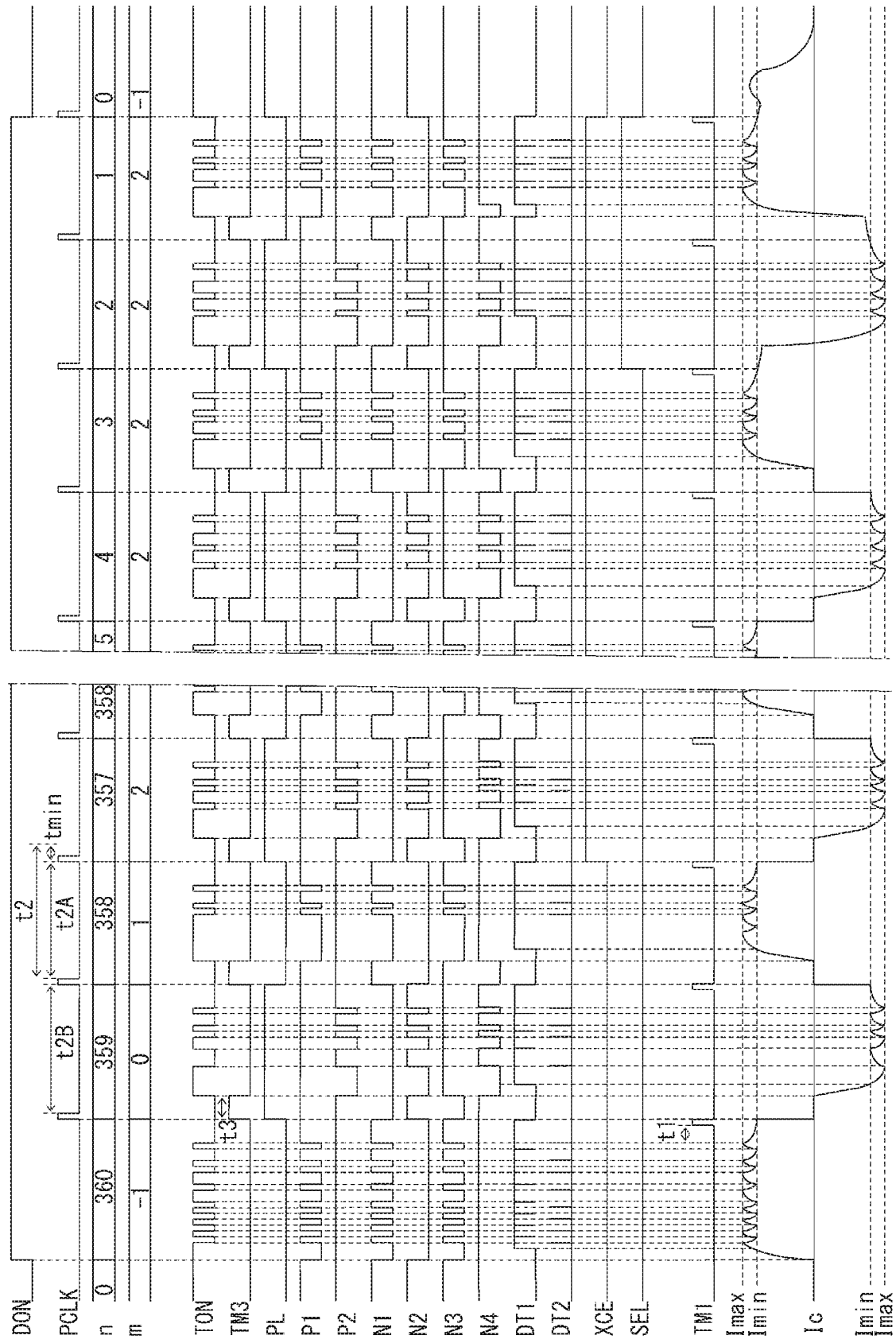
FIG. 13 is a timing chart illustrating operation of the motor control process in the second embodiment.

For example, because the difference with the previous drive period becomes less than tmin in the third step after driving starts in the timing chart in FIG. 13, the remaining count evaluation number m stops increasing after reaching 2. As a result, from one step before the last step, that is, in steps where the remaining number of drive steps n is less than or equal to 2, the shorted state lasts for time t3, the rotor 133 is decelerated, and overrunning is prevented.

In addition, when n=0, m is initialized to −1, and the selection signal SEL and signal XCE go Low as described above.

Effect of Embodiment 2

By providing a second timer 84, first latch circuit 85B, second latch circuit 86B, first comparator 88B, counter 89B, and third comparator 891 in the remaining drive step count detector 80B in the second embodiment, that the drive period stabilized after driving started, and the difference between the drive period and the previous drive step stabilized at less than a specific value tmin, can be detected.

As a result, because the rise in the drive speed is delayed when the inertial moment of the hands connected through a wheel train to a motor is great, the remaining count evaluation number m increases.

Because overrunning can easily occur when stopping if the inertial moment of the hand is great, deceleration must start at an earlier time before driving ends. Because deceleration by a short brake starts earlier as the rise in the drive speed takes longer in this embodiment, control is automatically optimized according to the difference in the inertial moment of the hand, and overrunning is prevented.

Variation of Embodiment 2

In the second embodiment described above the number of steps until the drive period stabilizes is set directly as the remaining count evaluation number mat which deceleration by a short brake starts, but a constant may be multiplied by the number of steps until the drive period stabilizes, or an offset may be added to set the remaining count evaluation number m at which deceleration starts. These configurations can be easily achieved by providing a multiplier circuit or setting an initial value for the remaining count evaluation number m.

Further alternatively, the relationship between the number of steps until the drive period stabilizes and the remaining number of steps at which deceleration starts may be defined by a table or equation set based on test results, for example.

In the second embodiment the number of drive steps until the difference of the drive period with the previous step goes below specific value tmin is counted, but the time from when driving starts may be measured instead of the number of drive steps, and the remaining count evaluation number m used to determine the number of steps at which to start deceleration may be determined from an equation or table.

Embodiment 3

An electronic timepiece according to a third embodiment is described next with reference to FIG. 14 to FIG. 18. Note that configurations in the third embodiment that are the same or similar to those in the first or second embodiment are identified by like reference numerals, and further description thereof is omitted.

Configuration

Figure 14:
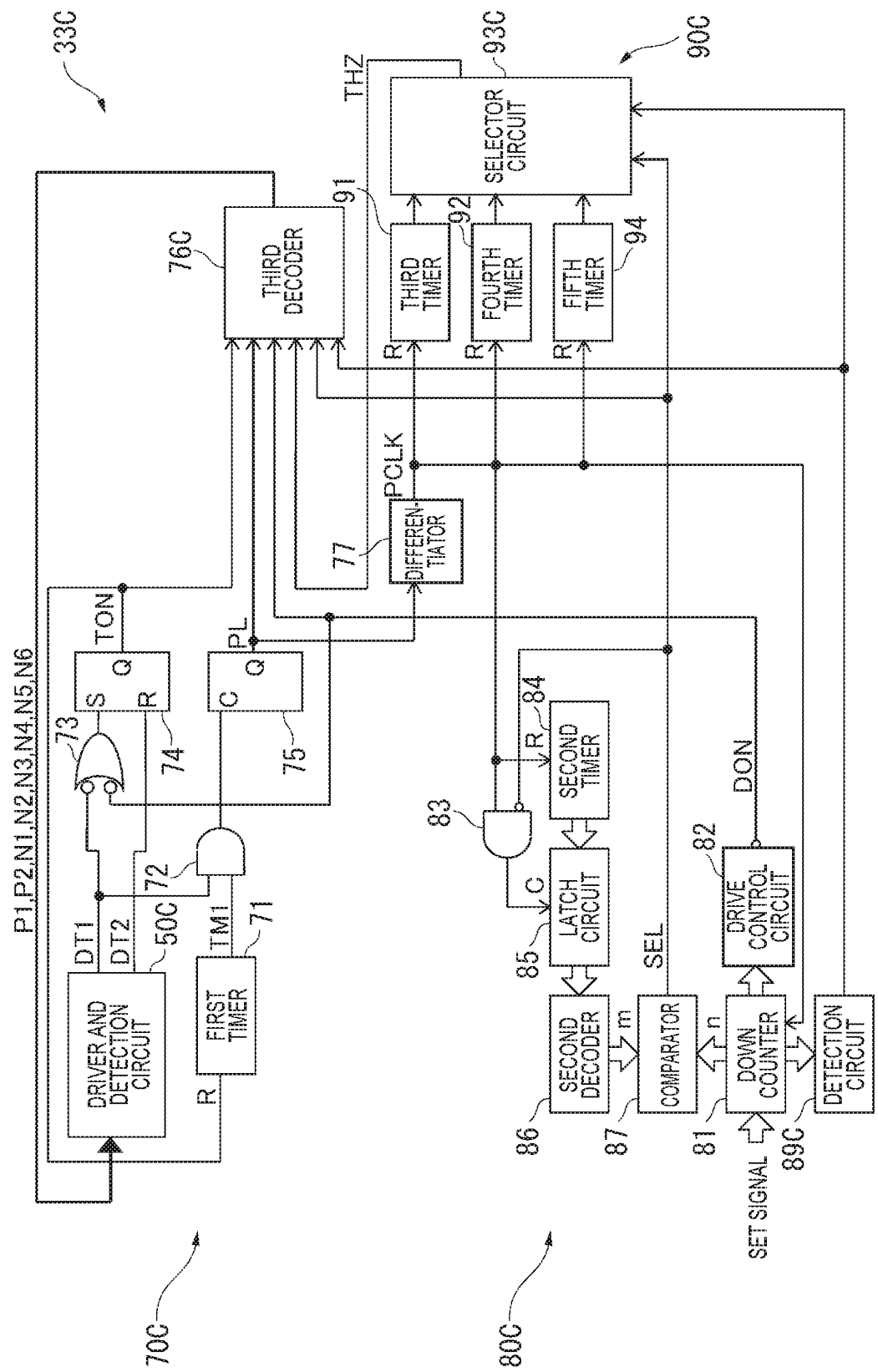
FIG. 14 is a circuit diagram illustrating the configuration of a third motor control circuit in a third embodiment.

An electronic timepiece according to the third embodiment uses a third motor control circuit 33C as shown in FIG. 14 instead of the third motor control circuit 33 of the first embodiment.

The third motor control circuit 33C in this embodiment includes a driver and detection circuit 50C, polarity changer 70C, remaining drive step count detector 80C, and a drive period adjuster 90C.

Figure 15:
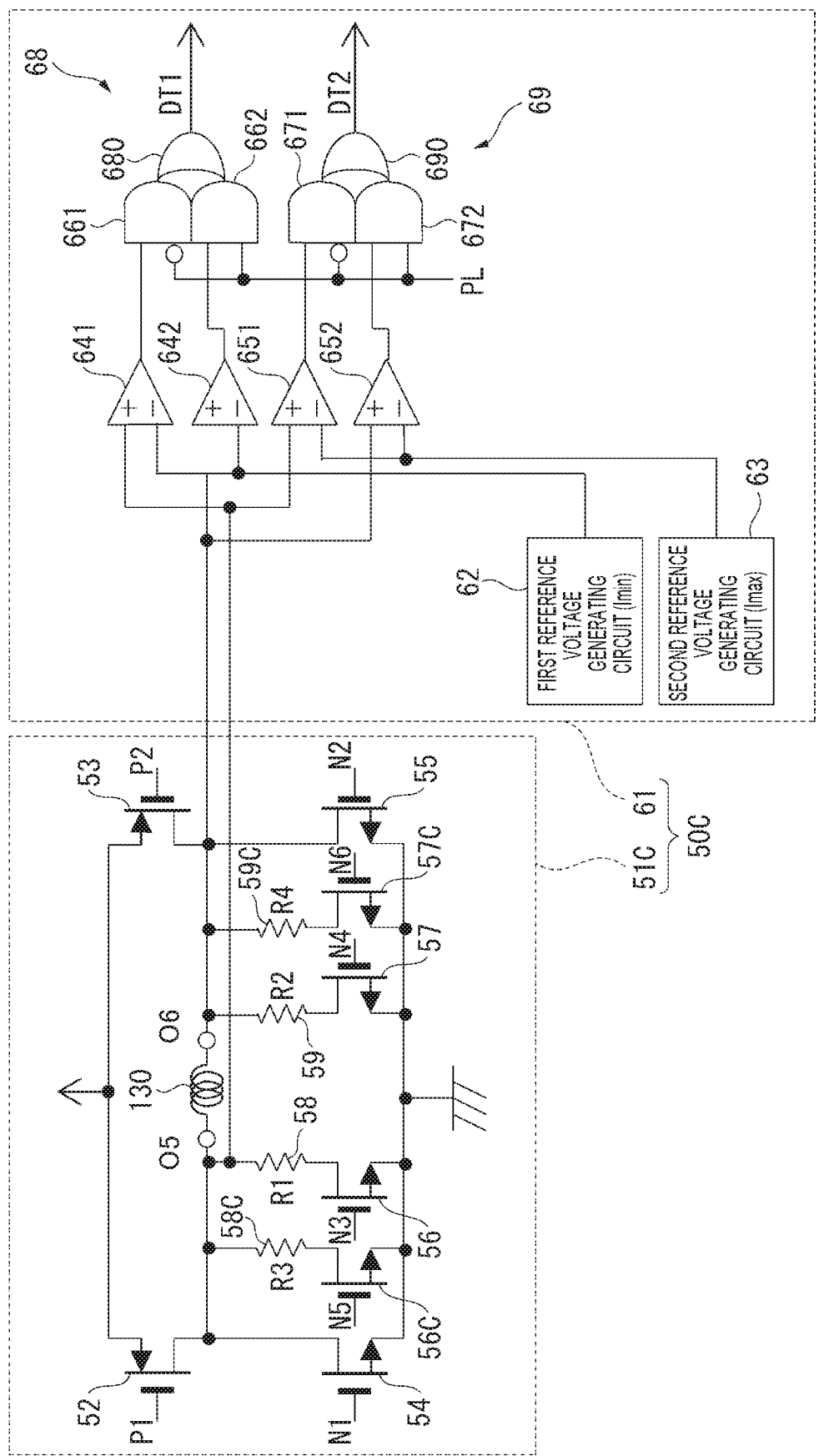
FIG. 15 is a circuit diagram illustrating the configuration of a driver and detection circuit in the third embodiment.

As shown in FIG. 15, the driver and detection circuit 50C includes a driver 51C and a current detection circuit 61. The current detection circuit 61 is configured as described in the first embodiment, and further description thereof is omitted.

The driver 51C differs from the driver 51 of the first embodiment in also having an n-channel transistor 56C and resistor 58C, and an n-channel transistor 57C and resistor 59C.

Resistor 58C is a resistor with resistance R3 that is lower than resistance R1, and is connected in parallel with resistor 58 to terminal O5 through the n-channel transistor 56C.

Resistor 59C has a resistance R4 that is lower than resistance R2, and is connected in parallel with resistor 59 to terminal O6 through the n-channel transistor 57C.

The driver 51C can be set to a high impedance state, which is a first state that turns the transistor connected to the terminal O5 or terminal O6 off; a shorted state, which is a third state shorting terminal O5 and terminal O6 with zero resistance; and a second state in which the n-channel transistor 56C or n-channel transistor 57C is turned on and terminal O5 and terminal O6 are shorted through resistor 58C or resistor 59C, producing a braking force between the high impedance state and the shorted state.

More specifically, because the terminals O5 and O6 are shorted in the third state, a short brake is applied to the rotor 133, and the rotor 133 can be decelerated with a great brake force.

Because the terminals O5 and O6 are shorted through resistor 58C or resistor 59C in the second state, the current flow to the coil 130 is lower than in the third state, and the power of the short brake applied to the rotor 133 is also lower. As a result, in the second state a smaller brake force is applied than in the third state, and the deceleration control amount of the rotor 133 is also lower.

Because terminal O5 or terminal O6 is set to a high impedance state and drive current does not flow in the first state, a short brake is not applied to the rotor 133, and the brake force is limited to the friction resistance, for example, of the rotor 133 pivot. As a result, the brake force applied in the first state is lower than in the second state, and the deceleration control amount of the rotor 133 is also lower.

The driver 51C can therefore control the brake force applied to the 133 in three stages.

As shown in FIG. 14, the polarity changer 70C includes a first timer 71, AND circuit 72, OR circuit 73, SR latch 74, flip-flop 75, and differentiator 77 configured as described in the first embodiment, and a third decoder 76C and driver and detection circuit 50C that differ from the configurations in the first embodiment.

The remaining drive step count detector 80C of the third motor control circuit 33C includes a down counter 81, drive control circuit 82, AND circuit 83, and a second timer 84, latch circuit 85, second decoder 86, and comparator 87 configured as in the first embodiment. The remaining drive step count detector 80C also has a detection circuit 89C that detects if n=1.

The detection circuit 89C is a detection circuit that detects if the remaining number of drive steps n of the down counter 81 equals 1.

The drive period adjuster 90C has a third timer 91 and fourth timer 92 as in the first embodiment, and a selector circuit 93C and a fifth timer 94.

The fifth timer 94 measures a time t7 that is longer than the time t3 measured by the third timer 91 and the time t4 that is measured by the fourth timer 92.

Based on the selection signal SEL output from the comparator 87 and a detection signal output from the detection circuit 89C, the selector circuit 93C sets the timing to start supplying drive current to the rotor 133, that is, selects the no-drive period signal THZ that sets the no-drive period in which drive current is not supplied.

Based on the change signal TON, drive polarity signal PL, drive control signal DON, no-drive period signal THZ, selection signal SEL, and detection signal output from the detection circuit 89C, the third decoder 76C controls the gate signals P1, P2, N1, N2, N3, N4, N5, and N6.

Operation of Embodiment 3

Figure 16:
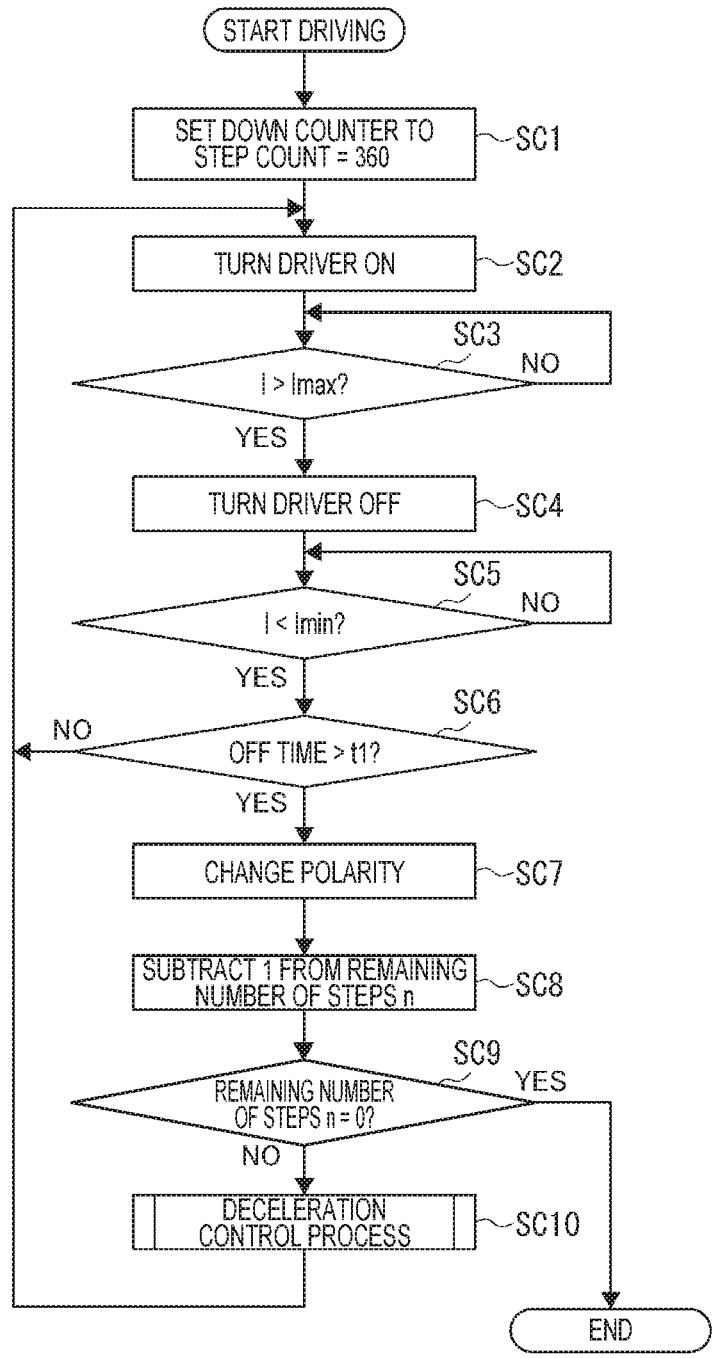
FIG. 16 is a flow chart describing the motor control process in the third embodiment.

Control by the third motor control circuit 33C in the third embodiment is described below with reference to the flow charts in FIG. 16 and FIG. 17, and the table in FIG. 18.

Control by the third motor control circuit 33C in this embodiment also controls moving the city hand 5 +1 hour, and therefore also controls rapidly moving the hour hand 2 and minute hand 3 +60 minutes. As a result, the operations in steps SC1 to SC9 in the flow chart in FIG. 16 are the same as the operations in steps SA1 to SA9 in the flow chart in FIG. 7 for the first embodiment, and further description thereof is omitted.

Figure 17:
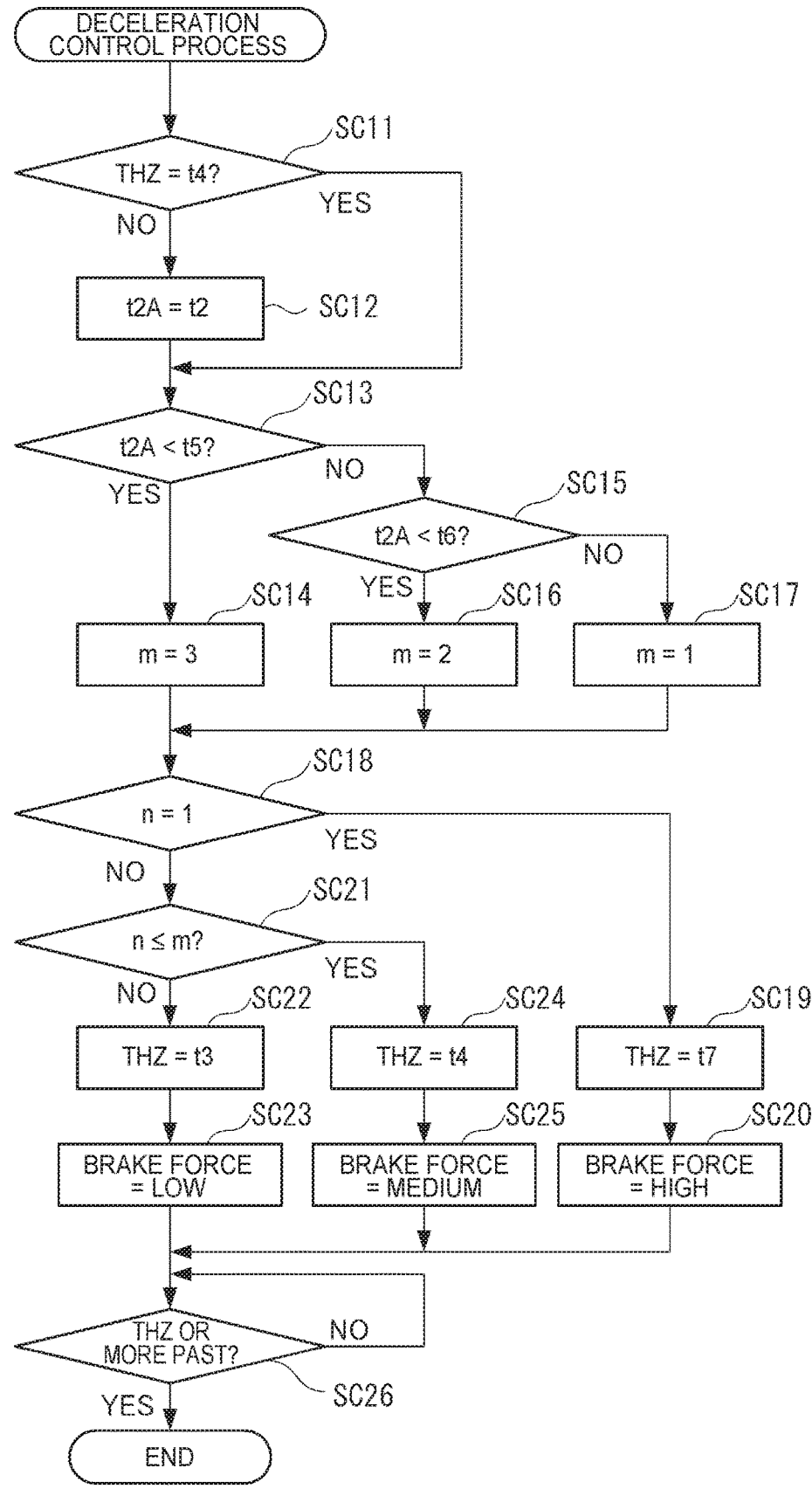
FIG. 17 is a flow chart describing a deceleration control process in the third embodiment.

If the third motor control circuit 33C determines YES in step SC9, the third motor control circuit 33C ends drive control of the third motor 43, and executes the deceleration control process SC10 shown in FIG. 17 if NO is determined.

Figure 8:
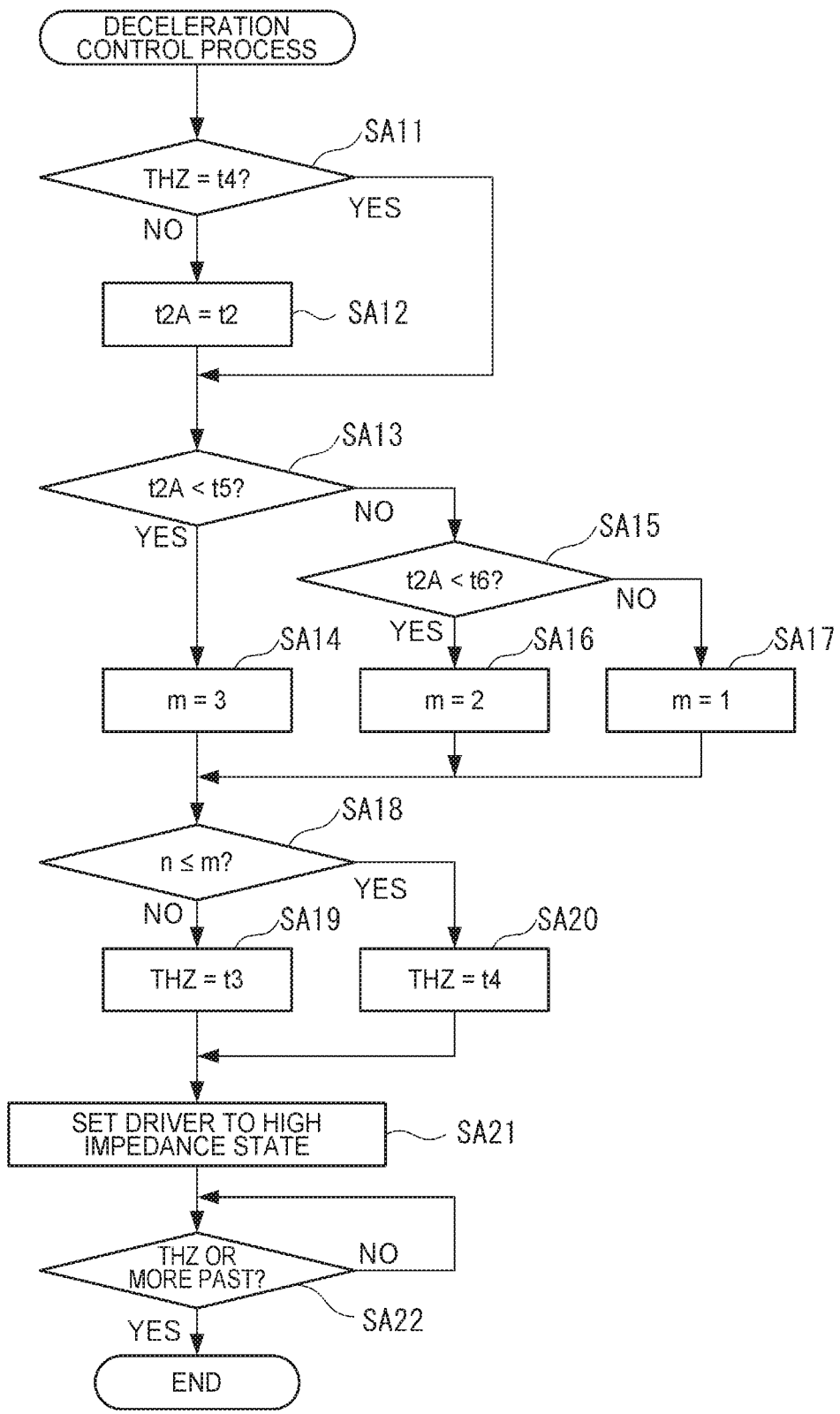
FIG. 8 is a flow chart describing a deceleration control process in the first embodiment.

The process of steps SC11 to SC17 in the flow chart in FIG. 17 is the same as the process of steps SA11 to SA17 in the flow chart in FIG. 8, and further description thereof is omitted.

After setting the remaining count evaluation number m in steps SC14 to SC17, the third motor control circuit 33C sets the remaining count evaluation number m, and then executes step SC18 to determine based on the output of the detection circuit 89C whether or not the remaining number of drive steps n=1.

If the third motor control circuit 33C determines YES in step SC18, the selector circuit 93C executes step SC19 to select the time t7 measured by the fifth timer 94 as the no-drive period signal THZ.

The third decoder 76C then executes step SC20 to control the gate signals so that the brake force is set to High from the three levels of Low, Medium, and High.

If NO is determined in step SC18, the comparator 87 of the third motor control circuit 33C executes step SC21 to determine whether or not the remaining number of drive steps n of the down counter 81 is less than or equal to the remaining count evaluation number m set by the second decoder 86.

If the comparator 87 determines NO in step SC21, the comparator 87 sets the selection signal SEL to Low, and executes step SC22 to set the no-drive period signal THZ to the time t3 measured by the third timer 91.

The third decoder 76C then executes step SC23 to control the gate signals so that the brake force is set to Low from the three levels of Low, Medium, and High.

If the comparator 87 determines YES in step SC21, the comparator 87 sets the selection signal SEL to High, and executes step SC24 to set the no-drive period signal THZ to the time t4 measured by the fourth timer 92.

The third decoder 76C then executes step SC25 to control the gate signals so that the brake force is set to Medium from the three levels of Low, Medium, and High.

Setting the brake force to Low, Medium, or High in each drive polarity is described next with reference to FIG. 18.

In the table in FIG. 18 a drive polarity signal PL of 0 indicates a first polarity in which current flows through the coil 130 from terminal O5 to terminal O6, and a 1 indicates a second polarity in which current flows through the coil 130 from terminal O6 to terminal O5.

In the settings shown in FIG. 18, the p-channel transistors 52, 53 are held in the off state by setting the gate signals P1, P2 High. Setting gate signals N1, N2, N3, N4, N5, N6 High or Low controls turning n-channel transistors 54, 55, 56, 57, 56C, 57C on and off, and sets the brake force. Only the states of n-channel transistors 54, 55, 56, 57, 56C, 57C are therefore described below.

To set the brake force to the Low setting when the drive polarity signal PL=0, the n-channel transistors 55, 57, 57C connected to terminal O6 are on, and the n-channel transistors 54, 56, 56C connected to terminal O5 are off. As a result, terminal O5 of the coil 130 goes to the high impedance state, which is a first state, and the brake force applied to the rotor 133 is a low brake force produced by friction between the pivot and bearing of the rotor 133.

To set the brake force to the Medium setting when the drive polarity signal PL=0, the n-channel transistors 55, 57, 57C connected to terminal O6 are on, the n-channel transistor 56C connected to the terminal O5 through resistor 58C is on, and the n-channel transistors 54, 56 connected to terminal O5 are off. As a result, the terminals O5 and O6 of the coil 130 go to the second state shorted through the resistor 58C of resistance R3, and the brake force applied to the rotor 133 is a medium brake force between the brake force when terminal O5 is in the high impedance state and when terminals O5 and O6 are shorted with zero resistance.

To set the brake force to the High setting when the drive polarity signal PL=0, the n-channel transistors 55, 57, 57C connected to terminal O6 are on, and the n-channel transistors 54, 56, 56C connected to terminal O5 are on. As a result, terminals O5 and O6 of the coil 130 go to a shorted state with zero resistance, and the maximum brake force is applied to the rotor 133.

Setting the brake force to the Low setting when the drive polarity signal PL=1 is similar to when the drive polarity signal PL=0, that is, the n-channel transistors 54, 56, 56C connected to terminal O5 are on, the n-channel transistors 55, 57, 57C connected to terminal O6 are off, terminal O6 of the coil 130 is in the high impedance state, and the brake force applied to the rotor 133 is a low brake force.

To set the brake force to the Medium setting when the drive polarity signal PL=1, the n-channel transistors 54, 56, 56C connected to terminal O5 are on, the n-channel transistor 57C connected to the terminal O6 through resistor 59C is on, and the n-channel transistors 55, 57 connected to terminal O6 are off. As a result, the terminals O5 and O6 of the coil 130 go to the shorted state through the resistor 59C of resistance R4, and the brake force applied to the rotor 133 is a medium brake force between the brake force when terminal O6 is in the high impedance state and when terminals O5 and O6 are shorted with zero resistance.

To set the brake force to the High setting when the drive polarity signal PL=1, the n-channel transistors 54, 56, 56C connected to terminal O5 are on, and the n-channel transistors 55, 57, 57C connected to terminal O6 are on. As a result, terminals O5 and O6 of the coil 130 go to a shorted state with zero resistance, and the maximum brake force is applied to the rotor 133.

The third decoder 76C of the third motor control circuit 33C sets the no-drive period signal THZ in step SC19, SC22, or SC24, sets the brake force in step SC20, SC23, or SC25, and then in step SC26 determines whether or not the no-drive period signal THZ, or more specifically time t3, t4, t7 or longer has past.

If the third decoder 76C determines NO in step SC26, the third decoder 76C maintains the output states of the gate signals corresponding to the set brake force. If the time set by the no-drive period signal THZ has past and the third decoder 76C determines YES in step SC26, the third decoder 76C ends the deceleration control process SC10, returns to step SC2 in FIG. 16, and starts outputting the drive pulses for the next step. The time t3, t4, or t7 set by the no-drive period signal THZ is therefore the deceleration period in which the rotor 133 is decelerated by the selected Low, Medium, or High brake force.

As a result of this process, when the remaining number of drive steps n is greater than the remaining count evaluation number m, the driver 51 is in a high impedance state and a low brake force is applied for time t3 until driving the next step when the polarity changes.

When the remaining number of drive steps n is less than or equal to the remaining count evaluation number m, the time until driving the next step starts is time t4, which is longer than time t3, the state of the driver 51 goes to a shorted state through resistor 58C or resistor 59C, and the brake force is a medium brake force between the high impedance state and the zero resistance shorted state.

When the remaining number of drive steps n is 1, that is, before the last pulse is output, the time until driving the last step is time t7, which is longer than time t4, the driver 51 is shorted, and the brake force is the maximum brake force.

Effect of Embodiment 3

The third motor control circuit 33C in this embodiment changes the brake force and no-drive period, that is, the deceleration time of the rotor 133, between three levels depending on whether the remaining number of drive steps n is greater than the remaining count evaluation number m, whether n is less than or equal to m, and whether n=1, and can thereby more reliably prevent the rotor 133 from over-running. More particularly, because the maximum brake force is set for the longest period time t7 before driving the last step, the rotor 133 can be quickly decelerated, and the rotor 133 reliably prevented from overrunning.

Furthermore, because this embodiment changes the brake force between three levels and also changes the deceleration period between three levels, the deceleration control amount of the rotor 133 can be adjusted in fine increments.

Other Embodiments

The invention is not limited to the embodiments described above, and can be modified and improved in many ways without departing from the scope of the accompanying claims.

As in the third embodiment, the first and second embodiments may also change the no-drive period, that is, the length of the deceleration time, from the last drive pulse to the output of drive pulses for the next step according to the load, and change the state of the driver 51, that is, the size of the brake force, and thereby control the two-stage deceleration control amount in fine increments.

In the third embodiment three deceleration periods and three brake force settings may be sequentially arranged to adjust the deceleration control amount in nine levels.

To improve the effect preventing the rotor 133 from overrunning, a pull-in pulse may be output for braking after detecting polarity inversion of the last pulse.

In the foregoing embodiments the third motor control circuit 33 to 33C is configured by logic circuits, but may be configured using a CPU 23 that directly controls the transistors of the driver 51 through the bus 27.

In the embodiments described above the electronic timepiece 1 is described as a wristwatch, but may be a table clock, for example.

The motor control circuit is also not limited to the third motor control circuit 33 to 33C that moves an hour hand 2 and minute hand 3, and may also be applied to the first motor control circuit 31 or second motor control circuit 32.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An electronic timepiece comprising:
   a motor having a coil and a rotor;
   a driver that has a terminal through which drive current is supplied to the coil, and which is controlled to an on state supplying the drive current to the coil, and an off state not supplying the drive current;
   a current detector configured to detect a current value flowing through the coil;
   a controller configured to control the driver to the on state or the off state according to the current value detected by the current detector;
   a polarity changer configured to determine driving one step of the motor ended and change the polarity of the drive current when an on time, which is a continuous time of the on state of the driver, or an off time, which is a continuous time of the off state of the driver, is detected to meet a specific condition;

a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to set the terminal supplying the drive current to the coil to a first state if the remaining drive step count is greater than the remaining count evaluation number, and if the remaining drive step count is less than or equal to the remaining count evaluation number, set the terminal to a second state in which a brake force applied to the rotor is greater than in the first state.

2. The electronic timepiece described in claim 1, further comprising:

a remaining count evaluation number setter configured to set the remaining count evaluation number based on a drive period of the motor.

3. The electronic timepiece described in claim 1, further comprising:

a remaining count evaluation number setter configured to set the remaining count evaluation number based on a number of drive steps or an elapsed time from a start of motor drive to convergence of the motor drive period.

4. The electronic timepiece described in claim 1, wherein:
the first state sets the terminal to a high impedance state; and
the second state sets the terminal to a shorted state.

5. The electronic timepiece described in claim 1, wherein:
the first state sets the terminal to a high impedance state; and
the second state sets the terminal to a shorted state through a specific resistance.

6. An electronic timepiece comprising:
a motor having a coil and a rotor;
a driver that has a terminal through which drive current is supplied to the coil, and which is controlled to an on state supplying the drive current to the coil, and an off state not supplying the drive current;
a current detector configured to detect a current value flowing through the coil;
a controller configured to control the driver to the on state or the off state according to the current value detected by the current detector;
a polarity changer configured to determine driving one step of the motor ended and change the polarity of the drive current when an on time, which is a continuous time of the on state of the driver, or an off time, which is a continuous time of the off state of the driver, is detected to meet a specific condition;
a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and a drive period adjuster configured to adjust the polarity changer to change the polarity of the drive current after a first specific time passes from detecting that the specific condition was met if the remaining drive step count is greater than the remaining count evaluation number, and if the remaining drive step count is less than or equal to the remaining count evaluation number, change the polarity of the drive current after a second specific time that is longer than the first specific time passes from detecting that the specific condition was met.

7. The electronic timepiece described in claim 6, further comprising:

a remaining count evaluation number setter configured to set the remaining count evaluation number based on a drive period of the motor.

8. The electronic timepiece described in claim 6, further comprising:

a remaining count evaluation number setter configured to set the remaining count evaluation number based on a number of drive steps or an elapsed time from the start of motor drive to convergence of the motor drive period.

9. A motor control circuit comprising:
a driver that has a terminal through which drive current is supplied to the coil of a motor, and which is controlled to an on state supplying the drive current to the coil, and an off state not supplying the drive current;
a current detector configured to detect a current value flowing through the coil;
a controller configured to control the driver to the on state or the off state according to the current value detected by the current detector;
a polarity changer configured to determine driving one step of the motor ended and change the polarity of the drive current when an on time, which is a continuous time of the on state of the driver, or an off time, which is a continuous time of the off state of the driver, is detected to meet a specific condition;
a remaining drive step count detector configured to detect whether or not a remaining drive step count, which indicates a remaining number of drive steps until driving the motor ends and is counted down 1 each time the polarity of the drive current changes, is less than or equal to a remaining count evaluation number; and
a drive period adjuster configured to adjust the polarity changer to change the polarity of the drive current after a first specific time passes from detecting that the specific condition was met if the remaining drive step count is greater than the remaining count evaluation number, and if the remaining drive step count is less than or equal to the remaining count evaluation number, change the polarity of the drive current after a second specific time that is longer than the first specific time passes from detecting that the specific condition was met.

\* \* \* \* \*